US011308427B2

(12) United States Patent
Kundu et al.

(10) Patent No.: US 11,308,427 B2
(45) Date of Patent: Apr. 19, 2022

(54) EVENT TRANSCRIPT PRESENTATION

(71) Applicant: Evernote Corporation, Redwood City, CA (US)

(72) Inventors: Anirban Kundu, Redwood City, CA (US); Andrew Henderson Malcolm, Redwood City, CA (US); Amir Doron, Redwood City, CA (US)

(73) Assignee: Evernote Corporation, Redwood City, CA (US)

( * ) Notice: Subject to any disclaimer, the term of this patent is extended or adjusted under 35 U.S.C. 154(b) by 0 days.

(21) Appl. No.: 16/162,127

(22) Filed: Oct. 16, 2018

(65) Prior Publication Data

US 2020/0104802 A1 Apr. 2, 2020

Related U.S. Application Data

(60) Provisional application No. 62/739,099, filed on Sep. 28, 2018.

(51) Int. Cl.
| | |
|---|---|
| *G06F 3/0484* | (2013.01) |
| *G06Q 10/06* | (2012.01) |
| *G06Q 10/10* | (2012.01) |
| *G06F 16/903* | (2019.01) |
| *G06F 16/9035* | (2019.01) |
| *G06F 16/9535* | (2019.01) |
| *G06F 16/9538* | (2019.01) |

(52) U.S. Cl.
CPC ... *G06Q 10/063114* (2013.01); *G06F 3/0484* (2013.01); *G06F 16/9035* (2019.01); *G06F 16/90335* (2019.01); *G06F 16/9535* (2019.01); *G06F 16/9538* (2019.01); *G06Q 10/103* (2013.01); *G06Q 10/1095* (2013.01)

(58) Field of Classification Search
CPC ..... G06F 3/0481; G06F 3/04815–0482; G06F 3/0484–04855; G06Q 10/0631–0633; G06Q 10/109–1097
See application file for complete search history.

(56) References Cited

U.S. PATENT DOCUMENTS

| | | | |
|---|---|---|---|
| 5,717,869 A | 2/1998 | Moran et al. | |
| 7,298,930 B1 * | 11/2007 | Erol | G06K 9/00711 382/305 |
| 2004/0095376 A1 * | 5/2004 | Graham | G06F 16/40 715/716 |

(Continued)

*Primary Examiner* — Linda Huynh
(74) *Attorney, Agent, or Firm* — Morgan, Lewis & Bockius LLP

(57) ABSTRACT

A computer system receives data that includes indications of a plurality of agenda items that correspond to the group event. During the group event, the system captures, by a media recording device, media data, converts the captured media data to a searchable version of the media data and searches the searchable version of the media data to determine a first time frame of the media data that corresponds to a first agenda item of the plurality of agenda items. The system displays, in a user interface that is accessible to at least one user associated with the group event, the representation of the media data. A first portion of the representation of the media data that corresponds to the first time frame is visually distinguished from at least a portion of the representation of the media data that does not correspond to the first time frame.

21 Claims, 30 Drawing Sheets

(56) References Cited

U.S. PATENT DOCUMENTS

| | | | | |
|---|---|---|---|---|
| 2006/0106872 | A1* | 5/2006 | Leban | G06Q 10/109 |
| 2006/0224430 | A1* | 10/2006 | Butt | G06Q 10/063116 |
| | | | | 705/7.16 |
| 2009/0306981 | A1* | 12/2009 | Cromack | G06F 16/685 |
| | | | | 704/235 |
| 2010/0125791 | A1* | 5/2010 | Katis | H04M 3/42221 |
| | | | | 715/716 |
| 2010/0306018 | A1* | 12/2010 | Burtner | G06Q 10/10 |
| | | | | 705/7.19 |
| 2011/0072362 | A1* | 3/2011 | Denner | G06Q 10/109 |
| | | | | 715/751 |
| 2011/0145823 | A1* | 6/2011 | Rowe | G06Q 10/109 |
| | | | | 718/100 |
| 2012/0179465 | A1* | 7/2012 | Cox | H04N 7/15 |
| | | | | 704/235 |
| 2012/0321062 | A1* | 12/2012 | Fitzsimmons | H04L 65/403 |
| | | | | 379/142.17 |
| 2012/0323575 | A1* | 12/2012 | Gibbon | H04L 67/306 |
| | | | | 704/246 |
| 2014/0164510 | A1* | 6/2014 | Abuelsaad | G06Q 10/109 |
| | | | | 709/204 |
| 2014/0350930 | A1* | 11/2014 | Cox | H04L 12/1822 |
| | | | | 704/235 |
| 2016/0092578 | A1* | 3/2016 | Ganani | G06F 16/9535 |
| | | | | 707/728 |
| 2016/0277577 | A1* | 9/2016 | Yentis | G10L 21/12 |
| 2018/0006837 | A1* | 1/2018 | Cartwright | H04N 7/147 |
| 2018/0101824 | A1* | 4/2018 | Nelson | H04L 12/1831 |
| 2018/0239822 | A1* | 8/2018 | Reshef | G10L 15/26 |
| 2019/0273767 | A1* | 9/2019 | Nelson | H04L 65/403 |

\* cited by examiner

Ezra Bridger ∨
Acme Corporation

Search notes...

⊕ New Note

☆ Shortcuts
📄 All Notes
📓 Notebooks
👥 Shared with Me

Meetings
☑ Tasks
🏷 Tags

Spaces
● Client - Flexus Inc
● Client - Mary Woods
● Onboarding
● Templates
● Weekly Reports
📁 Space Directory
🗑 Trash

---

Default ∨ 14 ∨ □ ∨ B I U ⊤ ⊄ (( ☑ ≡≡ ⋯ | ⊘ Client - Flexus Inc > 📄 Meeting Notes    ⚇ 8 [Share] • • •

≡ ∨ ☰ – 📎 ◎ ⊞ ∨

Marketing Weekly Sync
Date Friday, July 6, 2018
Time 4:00 PM - 4:30 PM
Location Conference Room 2A
Attendees Ezra Bridger, Ron Smith, Lisa Lee, Michelle Stein, Pete Hwang
Description End of week check-in for the Marketing department Marketing was charged with the Micro site to promote the 20th anniversary year. The site will be archived/saved for history within our site.

Our strategic goal as an organization for Fy15 is getting growth in membership, building a reserve fund and higher attendance at events. Is there anything else we should focus on?

1. Another goal is building the curriculum for BFF and marketing it.
2. The brochure was effective because it makes us look more professional as an organization when Lisa brings them to sales calls.

I. The committee should think a bout how the brochures are used by SPs and members and if it is enough to keep in the budget for next year.

( marketing ∨ )

---

📄 Related Meetings ∨   🔗 Copy Meeting Link — 652

▷ ━━━●━━━ 00:00:00 — 656
     654

AGENDA
Campaign updates
Project planning
Team updates
Next steps

HIGHLIGHTS   🔍
Add task, decision or Comment...
[Add ∨]  ▽ ⇌

28m 13s
① Next week's meeting will be on Thursday since a lot of folks are out on Friday.
26m 58s
⊘ Share a draft of next month's marketing summit schedule.
18m 02s
○ Connect with legal team on new agency contracts.
02m 58s
💬 Lisa: Thanks Ezra. I'll read more quotes at the end of the meeting.
02m 21s
💬 Ezra: That was a great customer quote. They clearly get our marketing message.

EVENT TRANSCRIPT PRESENTATION

RELATED APPLICATIONS

This application is a non-provisional application of and claims priority to U.S. Provisional Patent Application No. 62/739,099, filed Sep. 28, 2018, entitled, "Task-Based Action Generation," which is hereby incorporated by reference in its entirety.

TECHNICAL FIELD

This disclosure relates generally to providing a user with access to media data related to group events and, more particularly, to displaying a representation of the media data based on information known about a particular group event.

BACKGROUND

Although the real-time discussion that occurs during meetings is crucial to many business functions, meetings frequently lack the structure and topical focus to be worthwhile for participants. As a result, meeting participants often feel that attending a meeting was not a valuable use of time, but may nonetheless continue attending such meetings from concern about missing a key piece of information that may arise during a meeting.

By listening to a recording or reading a transcript or minutes of a meeting, a person may gain a sense of what was discussed during a meeting without spending time to attend the meeting. However, reviewing the entire content of a meeting may consume as much time as would have been spent at the meeting. A summary prepared by a meeting participant may be incomplete and lack the nuance of the meeting. A meeting that is productive and focused may nevertheless have its value diminished by the lack of a record of decisions and action items that arose from the meeting.

Often, members of an organization are unnecessarily invited to meetings. For example, a person may receive an invitation to a meeting because that person is a part of a group associated with a task, even though the person is not directly involved with the task.

SUMMARY

Accordingly, there is a need for improved methods and systems for managing actions such as meetings. Such methods and systems reduce the extent of input required from a user (e.g., by leveraging stored information about projects, tasks, members, and/or content), to improve the efficiency with which actions are managed.

The above deficiencies and other problems associated with existing approaches to are reduced or eliminated by the disclosed computer systems.

Without limiting the scope of the appended claims, after considering this disclosure, and particularly after considering the section entitled "Detailed Description," one will understand aspects of various embodiments.

In some embodiments, a method for displaying a representation of media data that corresponds to a group event is provided. The method comprises, at a computing device, receiving data that includes indications of a plurality of agenda items that correspond to the group event. During the group event, the device captures, by a media recording device, media data; converts the captured media data to a searchable version of the media data; and searches the searchable version of the media data to determine a first time frame of the media data that corresponds to a first agenda item of the plurality of agenda items. The method further comprises displaying, in a user interface that is accessible to at least one user associated with the group event, the representation of the media data. A first portion of the representation of the media data that corresponds to the first time frame is visually distinguished from at least a portion of the representation of the media data that does not correspond to the first time frame.

In some embodiments, a device comprises one or more processors and memory storing one or more programs for execution by the one or more processors. The one or more programs include instructions for receiving data that includes indications of a plurality of agenda items that correspond to the group event. The one or more programs further include instructions for, during the group event, capturing, by a media recording device, media data; converting the captured media data to a searchable version of the media data; and searching the searchable version of the media data to determine a first time frame of the media data that corresponds to a first agenda item of the plurality of agenda items. The one or more programs further include instructions for displaying, in a user interface that is accessible to at least one user associated with the group event, the representation of the media data. A first portion of the representation of the media data that corresponds to the first time frame is visually distinguished from at least a portion of the representation of the media data that does not correspond to the first time frame.

In some embodiments, a computer readable storage medium stores one or more programs for execution by one or more processors. The one or more programs include instructions for receiving data that includes indications of a plurality of agenda items that correspond to the group event. The one or more programs include instructions for, during the group event, capturing, by a media recording device, media data; converting the captured media data to a searchable version of the media data; and searching the searchable version of the media data to determine a first time frame of the media data that corresponds to a first agenda item of the plurality of agenda items. The one or more programs further include instructions for displaying, in a user interface that is accessible to at least one user associated with the group event, the representation of the media data. A first portion of the representation of the media data that corresponds to the first time frame is visually distinguished from at least a portion of the representation of the media data that does not correspond to the first time frame.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 6A-6F illustrate event user interfaces, in accordance with some embodiments.

FIG. 12 illustrates a graphical user interface displayed during an event, in accordance with some embodiments.

In accordance with common practice, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

Embodiments described herein may be implemented in a content management platform (e.g., Evernote or Evernote Business). In some embodiments, the content management platform includes tools for administration of content, projects, tasks, divisions, members, events, and/or clients of an organization. The tools provide users with the ability to store, share, view, edit, and/or organize information that is administered via the platform. In some embodiments, the content management platform includes a Meetings feature that includes interfaces and functions associated with events of an organization (e.g., as described further with regard to FIGS. 6A-6F).

Figure 1:
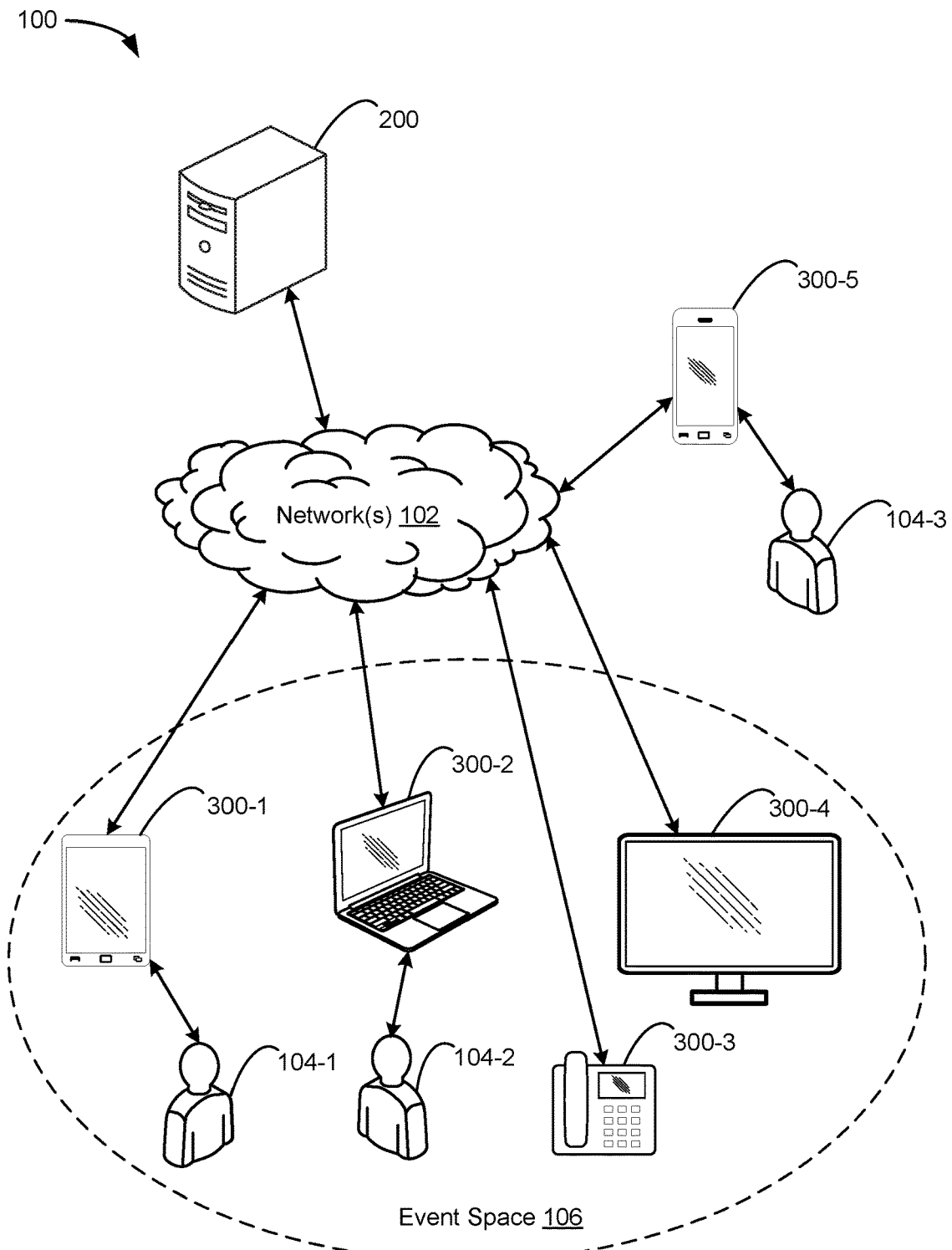
FIG. 1 is a system diagram that illustrates devices of a content management platform, in accordance with some embodiments

FIG. 1 is a system diagram that illustrates devices of a content management platform (e.g., as used to access and/or interact with a Meetings feature of the content management platform), in accordance with some embodiments. System 100 includes server 200, described further with regard to FIG. 2. Data is communicated between server 200 and various client devices 300 (e.g., devices 300-1, 300-2, 300-3, 300-4, and 300-5) via network(s) 102. For example, a portable electronic device 300-1 is operated by user 104-1, a laptop device 300-2 is operated by user 104-2, and a portable electronic device 300-5 is operated by user 104-3. User 104-1 and user 104-2 are physically located in an event space 106 in which an event (e.g., a meeting) is taking place and user 104-3 is remote from the event space 106 (e.g., user 104-3 is participating in the meeting from a remote location). Conference telephone 300-3 and display device 300-4 are also located in event space 106. User devices 300 display information received from server 200 and/or transmit information to server 200.

In some embodiments, one or more client devices 300 display the same user interface (e.g., a meeting user interface related to the event occurring in event space 106). In some embodiments, a first portion of event content (e.g., a presentation) is displayed on a first respective device of client devices 300 (e.g., display 300-4), a second portion of event content (e.g., a meeting summary) is displayed on a second respective device of user devices 300 (e.g., portable electronic device 300-1), and a third portion of event content (e.g., an agenda) is displayed on a third respective device of client devices 300 (e.g., laptop 300-2).

Figure 2:
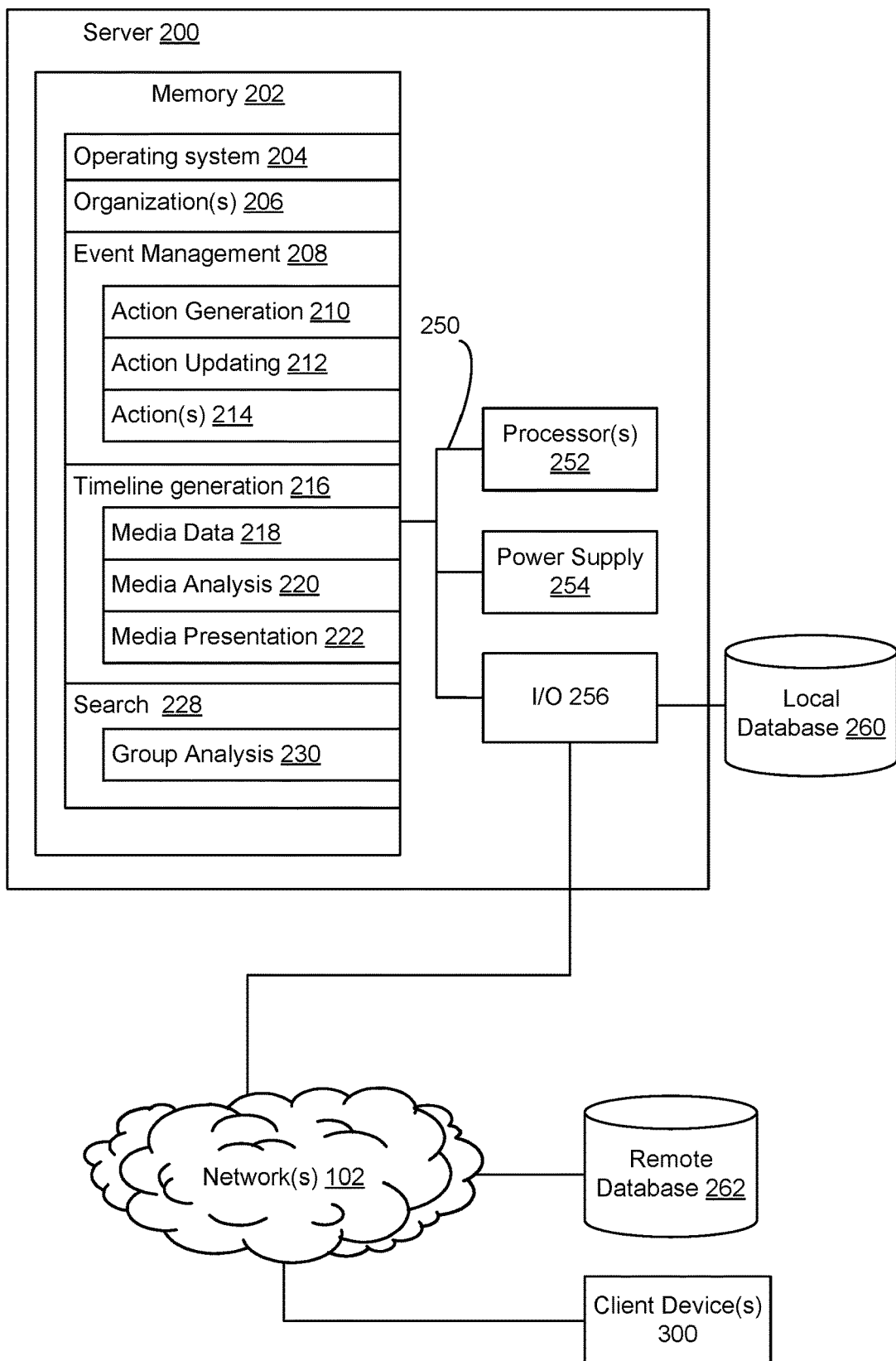
FIG. 2 is a system diagram of a server device, in accordance with some embodiments.

FIG. 2 is a system diagram of server device 200, in accordance with some embodiments. Server device 200 typically includes one or more processor(s) 252, a memory 202, a power supply 254, an input/output (I/O) subsystem 256, and a communication bus 250 for interconnecting these components.

Processor(s) 252 execute modules, programs and/or instructions stored in memory 202 and thereby perform processing operations.

In some embodiments, the memory 202 stores one or more programs (e.g., sets of instructions) and/or data structures, collectively referred to as "modules" herein. In some embodiments, memory 202, or the non-transitory computer readable storage medium of memory 202 stores the following programs, modules, and data structures, or a subset or superset thereof:

operating system 204;

organization(s) 206 data, including a collection of data related to an organization (e.g., as described with regard to FIG. 5 and FIGS. 5A-5C);

event management module 208, including:

action generation module 210 for generating an action (e.g., an event, such as a meeting) based on a task (e.g., as described with regard to FIGS. 7-8); and action updating module 212 for updating an action (e.g., in accordance with a determination of a change in a status of a member, task, and/or content associated with the action); and action(s) 214 generated by action generation module 210;

timeline generation module 216, including:

media data module 218 for capturing and/or storing media data (e.g., event media data captured by one or more client devices 300 during an event);

media analysis module 220 for analyzing media data (e.g., as described with regard to FIGS. 10A-10B, 11A-11E, 12, and 13A-13B); and media presentation module 222 for presenting a representation of media data (e.g., as described with regard to FIGS. 10A-10B, 11A-11E, 12, and 13A-13B); and search module 228, including:

group analysis module 230 for comparing members of a group to assign weights to respective search results (e.g., as described with regard to FIGS. 14-17).

The above identified modules (e.g., data structures, and/or programs including sets of instructions) need not be implemented as separate software programs, procedures or modules, and thus various subsets of these modules may be combined or otherwise re-arranged in various embodiments. In some embodiments, memory 202 stores a subset of the modules identified above. Furthermore, the memory 202 may store additional modules not described above. In some embodiments, the modules stored in memory 202, or a non-transitory computer readable storage medium of memory 202, provide instructions for implementing respective operations in the methods described below. In some embodiments, some or all of these modules may be implemented with specialized hardware circuits that subsume part or all of the module functionality. One or more of the above identified elements may be executed by one or more of processor(s) 252. In some embodiments, local database 260 or remote database 262 stores one or more modules identified above (e.g., actions 214 are stored by a database as an event 530 (FIG. 5B) and/or media data 218 is stored by a database as event media of event 530). In some embodiments, one or more of the modules described with regard to memory 202 is implemented on memory 302 of client device 300 (FIG. 3).

I/O subsystem 256 communicatively couples server 200 to local devices (e.g., local database 260) and/or remote devices (e.g., devices accessed via a communications network 102 (e.g., the Internet), such as remote database 262 and client device(s) 300) via a wired and/or wireless connection.

Communication bus 250 optionally includes circuitry (sometimes called a chipset) that interconnects and controls communications between system components.

Figure 3:
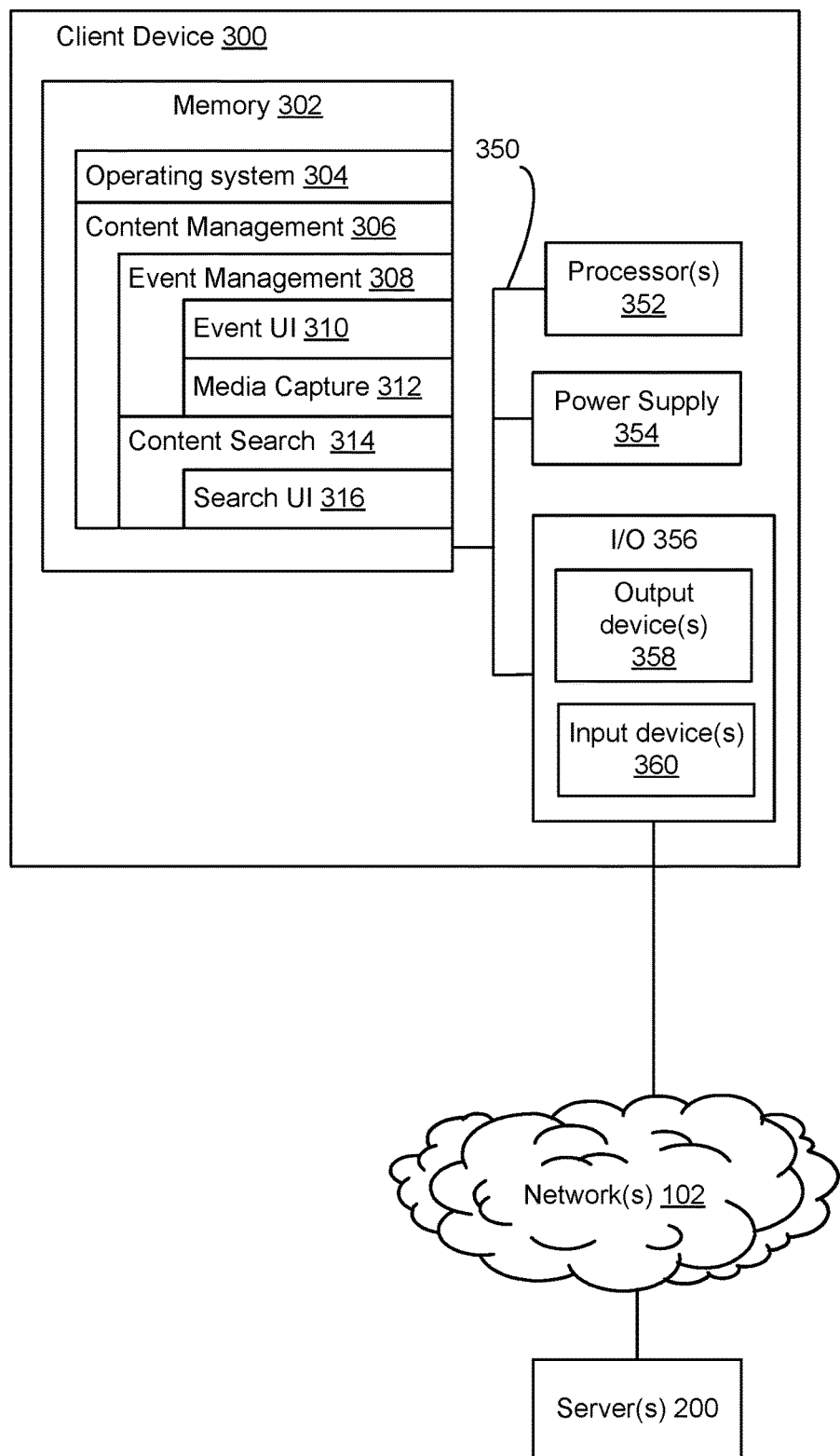
FIG. 3 is a system diagram of a client device, in accordance with some embodiments.

FIG. 3 is a system diagram of client device 300, in accordance with some embodiments. Client device 300 typically includes one or more processor(s) 352, a memory 302, a power supply 354, an input/output (I/O) subsystem 356 and a communication bus 350 for interconnecting these components. Client devices 300 include, e.g., portable electronic devices (e.g., portable media players, cellular telephones, tablets, and/or laptop computers), presentation devices (e.g., network-enabled displays, digital whiteboards, and/or projectors), desktop computing devices, audio recording devices, video recording devices, and/or conference telephone systems.

Processor(s) 352 execute modules, programs and/or instructions stored in memory 302 and thereby perform processing operations.

In some embodiments, the memory 302 stores one or more programs (e.g., sets of instructions) and/or data structures, collectively referred to as "modules" herein. In some embodiments, memory 302, or the non-transitory computer readable storage medium of memory 302 stores the following programs, modules, and data structures, or a subset or superset thereof:

operating system 304;

local content management module 306 (e.g., a content management application that runs locally on client device 300), including:

local event management module 308, which includes:

event user interface(s) module 310 for displaying user interfaces related to actions (e.g., as described with regard to FIGS. 7-8); and media capture module 312 for capturing media (e.g., audio and/or video) of actions (e.g., using input device(s) 360); and content search module 314, which includes search user interface(s) module 316 for displaying user interfaces related to search operations (e.g., as described with regard to FIGS. 14-17).

The above identified modules (e.g., data structures, and/or programs including sets of instructions) need not be implemented as separate software programs, procedures or modules, and thus various subsets of these modules may be combined or otherwise re-arranged in various embodiments. In some embodiments, memory 302 stores a subset of the modules identified above. Furthermore, the memory 302 may store additional modules not described above. In some embodiments, the modules stored in memory 302, or a non-transitory computer readable storage medium of memory 302, provide instructions for implementing respective operations in the methods described below. In some embodiments, some or all of these modules may be implemented with specialized hardware circuits that subsume part or all of the module functionality. One or more of the above identified elements may be executed by one or more of processor(s) 352. In some embodiments, one or more of the modules described with regard to memory 302 is implemented on memory 202 of server device 200 (FIG. 2). For example, in some embodiments, server device 200 causes event user interface(s) 310 and/or search user interface(s) to be displayed by client device 300 and/or transmits information for display by event user interface(s) 310.

I/O subsystem 356 communicatively couples client device 300 to local devices (e.g., input device(s) 360 and/or output device(s) 358) and/or remote devices (e.g., devices accessed via a communications network 102 (e.g., the Internet), such as server 200) via a wired and/or wireless connection. In some embodiments, an input device 360 and/or an output device 358 are integrated with client device 300 (e.g., as a touchscreen display). In some embodiments, user input device 358 and/or an output device 358 are peripheral devices communicatively connected to user device 100. In some embodiments, input device(s) 360 include, for example, an audio capture device (e.g., a microphone that is integrated into client device 300 or a peripheral audio capture device), an image capture device (e.g., a camera that is integrated into client device 300 or a peripheral image capture device), a keyboard, and/or a pointer device such as a mouse, touchpad, touchscreen and/or stylus. In some embodiments, output device(s) 358 include, e.g., a display and/or a speaker.

Communication bus 350 optionally includes circuitry (sometimes called a chipset) that interconnects and controls communications between system components.

Figure 4:
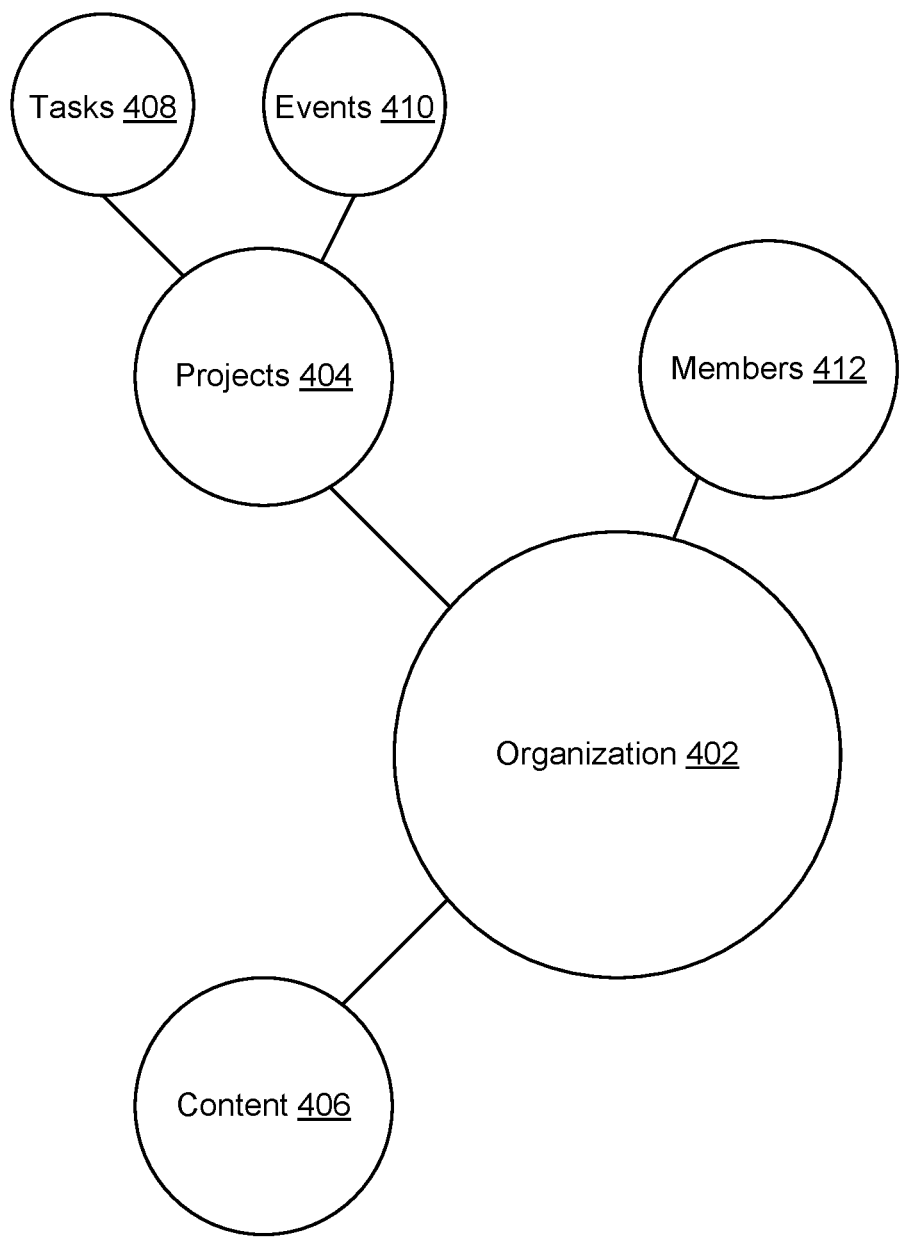
FIG. 4 is a conceptual diagram of a collection of data related to an organization, in accordance with some embodiments.

FIG. 4 is a conceptual diagram of a collection of data related to an organization 402, as implemented in a content management platform, in accordance with some embodiments. Organization 402 indicates an organization (also referred to herein as a "group") such as a business, educational organization, government organization, or other collection of people. Organization 402 represents data related to members 412, projects 404, and content 406 that are associated with organization 402 (for example, as described with regard to FIGS. 5A-5C). Members 412 include, for example, people that are a part of an organization or people that are otherwise related to or affiliated with an organization. Projects 404 (also referred to herein as "Spaces") include, for example, data indicating or associated with projects and/or goals of an organization. In some embodiments, projects 404 include tasks 408 (e.g., action items and/or decisions) that are associated with a project and/or events 410 (e.g., meetings) that are associated with a project. Content 406 includes, for example, documents, media (e.g., audio, video, and/or images), notes, and/or internet clipping. As described further below with regard to FIGS. 5A-5C, content 406 may be associated with one or more organizations(s) 402, project(s) 404, task(s) 408, event(s)410, and/or member(s) 412. A project 404, task 408, and/or event 410 may be associated with one or more member(s) 412.

Figure 5A:
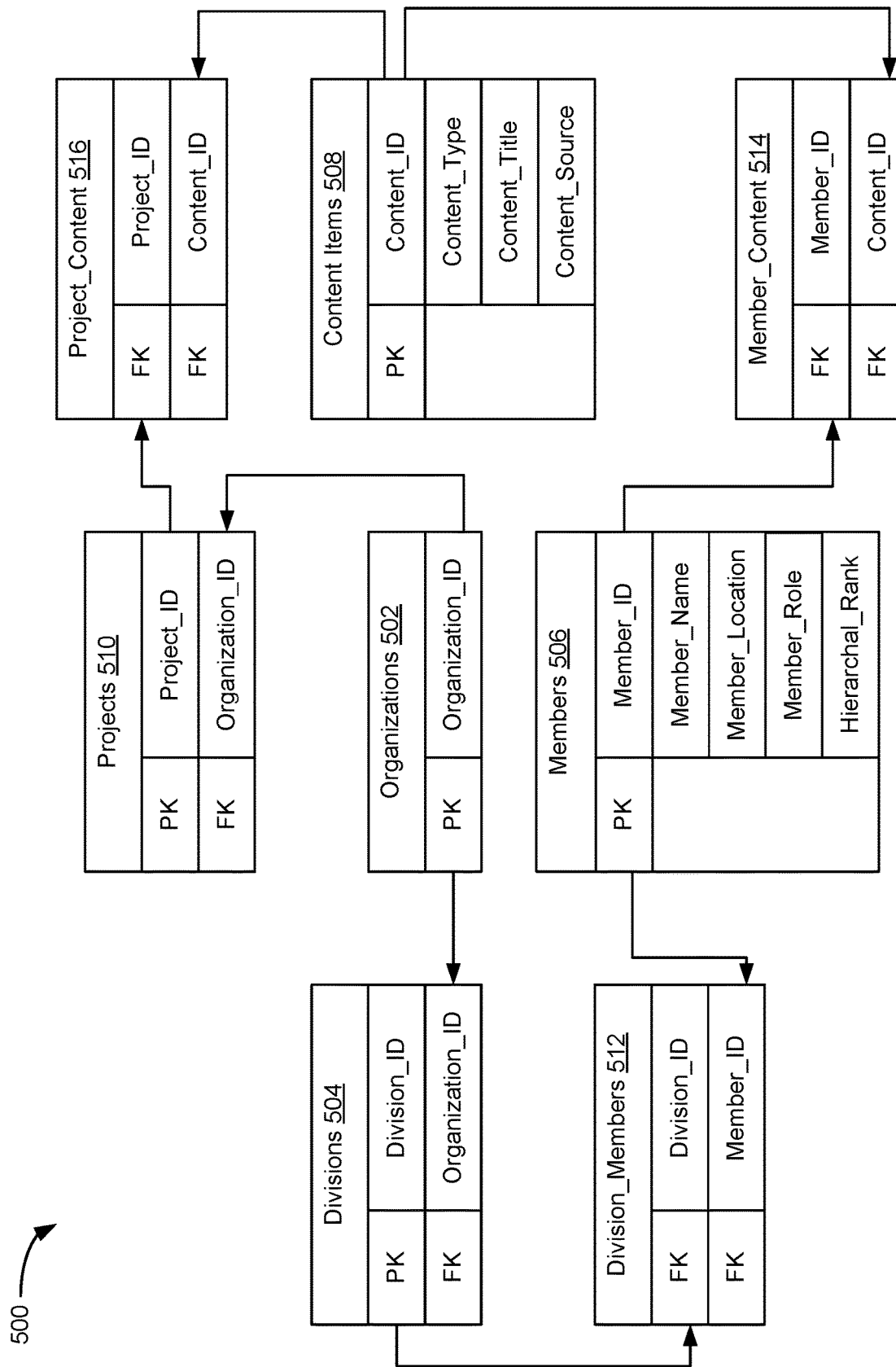
FIGS. 5A-5C illustrate a database schema that corresponds to an organization, in accordance with some embodiments.
Figure 5B:
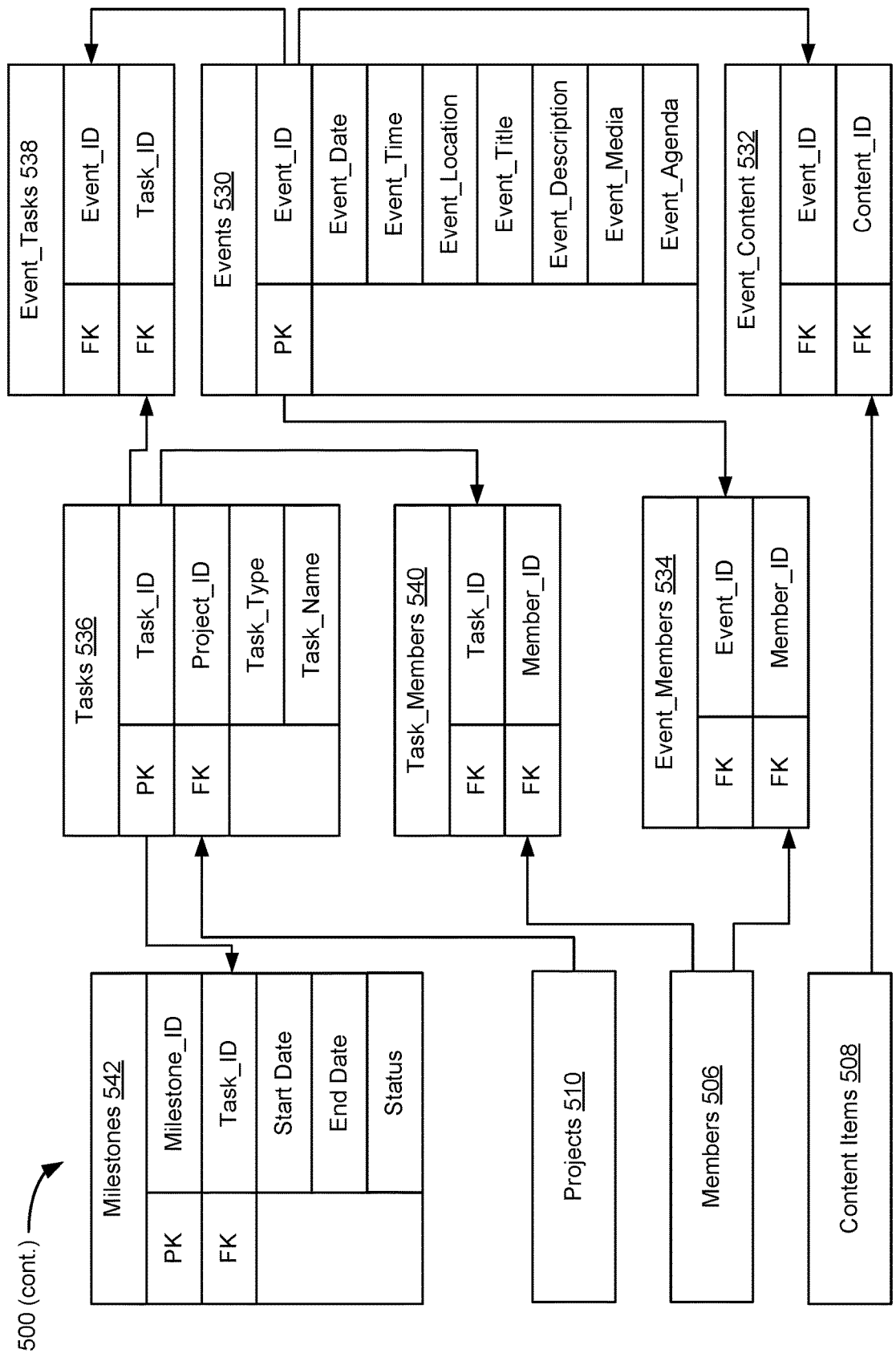
Figure 5C:
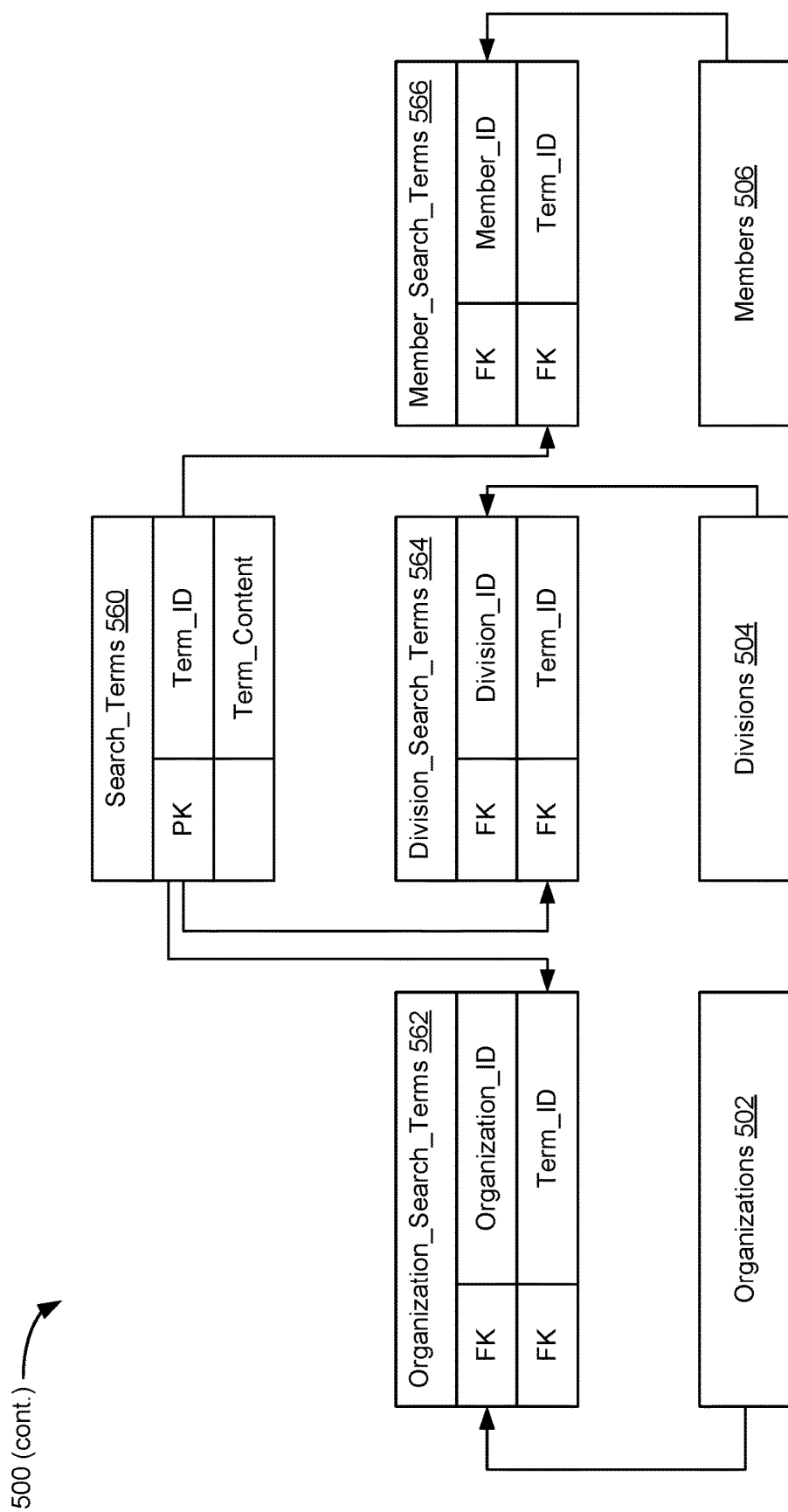

FIGS. 5A-5C illustrate a database schema 500 that corresponds to an organization 502 (e.g., an organization 402), in accordance with some embodiments. Database schema 500 illustrates, for example, the structure of data and relations between data of a database that stores the data described with regard to FIG. 4.

Database schema 500 includes an organizations table 502 that includes a column (e.g., a data field) "Organization_ID" that is the primary key (PK) of the table (e.g., each entry in the Organization_ID column is unique). For example, an organization indicated by an organization entry (row) in the Organization_ID column corresponds to an organization 402 as described with regard to FIG. 4. In some embodiments, organization names are stored in the Organization_ID column. In some embodiments, a unique number is generated for Organization_ID each time a new organization is added and the name of the organization is stored in a separate field of organizations 502 (e.g., organizations table 502 includes an Organization_Name column (not shown)).

In some embodiments, database schema 500 includes a divisions table 504 that includes a column "Division_ID" that is the primary key of the table. The divisions table 504 also includes an "Organization_ID" column that is a foreign key (FK), indicating that the divisions table 504 is a child table of the organizations table 502. The Organization_ID FK indicates that, for each division indicated by a division entry (row) in the division_ID column, there is an associated organization_ID that corresponds to an organization to which the division belongs. For example, a division (also referred to herein as a "subgroup") indicated by a division entry in the division_ID column is a team (e.g. a legal team, marketing team, development team, management team etc.) or other subset of members from a set of members of an organization.

In some embodiments, database schema 500 includes a members table 506 that includes a column "Member_ID" that is the primary key of the table. A member indicated by a member entry in the Member_ID column is, for example, a member 402 as described with regard to FIG. 4. In some embodiments, members table 506 includes a Member_Name column (e.g., to indicate a given name of a member, distinct from a unique identifier stored in the Member_ID column).

In some embodiments, members table 506 includes a Member_Location (e.g., a site where a member performs work for an organization), a Member_Role (e.g., a job title, project role, and/or task role), and a Hierarchal_Rank (e.g., an indication of a member's rank (e.g., management level) relative to other members of the organization).

Division members table 512 is used to create relationships between Division_IDs and Member_IDs such that members can be associated with divisions in many-to-many relationships (e.g., a division can include multiple members and a member can belong to multiple divisions).

In some embodiments, database schema 500 includes a content items table 508 that includes a column "Content_ID" that is the primary key of the table. A content item indicated by a content entry in the Content_ID column is, for example, a content item 406 as described with regard to FIG. 4. In some embodiments, content items table 508 includes a Content_Type column (e.g., to indicate whether the content item is a document, a media item, a note, and/or and internet clipping). In some embodiments, content items table 508 includes a Content_Title (e.g., a title of a content item that is distinct from a unique identifier generated for the Content_ID entry) and a Content_Source (e.g., a website from which an internet clipping was obtained).

Member_content table 514 is used to create relationships between Content_IDs and Member_IDs such that members can be associated with content items in many-to-many relationships. In some embodiments, Member_content table 415 includes a row (not shown) indicating a relationship of the member to a content item (for example, the relationship indicates whether a member identified by Member_ID is associated with content identified by Content_ID has created, modified, viewed, and/or shared the content item).

In some embodiments, database schema 500 includes a projects table 510 that includes a column "Project_ID" that is the primary key of the table. A project indicated by a project entry in the Project_ID column is, for example, a project 404 as described with regard to FIG. 4. The projects table 510 also includes an "Organization_ID" column that is a foreign key, indicating that the projects table 510 is a child table of the organizations table 502.

Project_content table 516 is used to create relationships between Content_IDs and Project_IDs such that content items can be associated with projects in many-to-many relationships.

FIG. 5B illustrates a second portion of database schema 500. Projects table 510 as shown in FIG. 5B is an abbreviated representation of projects table 510 as shown in FIG. 5A, members table 506 as shown in FIG. 5B is an abbreviated representation of projects table 506 as shown in FIG. 5A, and content items table 508 as shown in FIG. 5B is an abbreviated representation of content items table 508 as shown in FIG. 5A.

In some embodiments, database schema 500 includes an events table 530 that includes a column "Event_ID" that is the primary key of the table. An event item indicated by an event entry in the Event_ID column is, for example, an event item 410 as described with regard to FIG. 4. In some embodiments, events table 530 includes an Event_Date column (e.g., to indicate a scheduled date of the event), an Event_Time (e.g., to indicate a scheduled time of the event), an Event_Location column (e.g., to indicate a location of a scheduled event), an Event_Title column (e.g., to indicate a name for the event distinct from the unique identifier generated for the Event_ID entry), an Event_Description column (e.g., to provide a description of the purpose of the vent), an Event_Media column (e.g., to store media data 218 as described with regard to FIG. 2), and/or an Event_Agenda (e.g., to store a set of agenda items (e.g., tasks 536) to be covered during an event).

Event_Content table 532 is used to create relationships between Content_IDs and Event_IDs such that events can be associated with content items in many-to-many relationships.

Event_Members table 534 is used to create relationships between Event_IDs and Member_IDs such that events can be associated with tasks in many-to-many relationships.

In some embodiments, database schema 500 includes a tasks table 536 that includes a column "Task_ID" that is the primary key of the table. A task item indicated by a task entry in the Task_ID column is, for example, a task item 408 as described with regard to FIG. 4. The tasks table 536 also includes a "Project_ID" column that is a foreign key, indicating that the tasks table 536 is a child table of the projects table 510. In some embodiments, task table 536 includes a Task_Type column (e.g., to indicate whether the task is an action item or a decision item) and/or a Task_Name column (e.g., to indicate a name for the task distinct from the unique identifier generated for the Task_ID entry).

Event_Tasks table 538 is used to create relationships between Event_IDs and Task_IDs such that events can be associated with tasks in many-to-many relationships.

Task_Members table 540 is used to create relationships between Task_IDs and Member_IDs such that tasks can be associated with members in many-to-many relationships.

In some embodiments, a Task_Content table (not shown) is used to create relationships between Task_IDs and Content_IDs such that tasks can be associated with content items in many-to-many relationships In some embodiments, database schema 500 includes a milestones table 542 that includes a column "Milestone_ID" that is the primary key of the table. A milestone item indicated by a milestone entry in the Milestone_ID column is, for example, a date associated with a task (or a respective date of a series of dates associated with respective subtasks of a task). The milestones table 542 also includes a "Task_ID" column that is a foreign key, indicating that the milestones table 542 is a child table of the tasks table 536. In some embodiments, milestones table 542 includes a Start Date column (e.g., to indicate a start date and/or time associated with a task) and/or an End Date column (e.g., to indicate an end date and/or time associated with a task). In some embodiments, milestones table 542 includes a Status column (e.g., to indicate whether or not the milestone has been completed).

FIG. 5C illustrates a third portion of database schema 500. Organizations table 502 as shown in FIG. 5C is an abbreviated representation of organizations table 502 as shown in FIG. 5A, divisions table 504 as shown in FIG. 5C is an abbreviated representation of divisions table 504 as shown in FIG. 5A, and members table 506 as shown in FIG. 5C is an abbreviated representation of members table 506 as shown in FIG. 5A.

In some embodiments, database schema 500 includes a Search_Terms table 560 that includes a column "Term_ID" that is the primary key of the table. A search term indicated by a term entry in the Term_ID column is, for example, a search term entered in a search user interface 316 displayed on a client device 300 that accesses data of content management system 100 (e.g., as described further below with regard to FIGS. 14-17). The search terms table 560 also includes a Term_Content column (e.g., to indicate a word, phrase, or sentence that corresponds to a search query, distinct from the unique identifier generated for the Term_ID entry).

In some embodiments, database schema 500 includes an Organization_Search_Terms table 562 that is a child table of organizations table 502 (as indicated by the Organization_ID foreign key) and search terms table 560 (as indicated by the Term_ID foreign key). The Organization_Search_Terms table 562 indicates search terms that are used (e.g., with a defined measure of uniqueness or predominance) by an organization.

In some embodiments, database schema 500 includes a Division_Search_Terms table 564 that is a child table of divisions table 504 (as indicated by the Division_ID foreign key) and search terms table 560 (as indicated by the Term_ID foreign key). The Division_Search_Terms table 564 indicates search terms that are used (e.g., with a defined measure of uniqueness or predominance) by a division.

In some embodiments, database schema 500 includes a Member_Search_Terms table 566 that is a child table of members table 506 (as indicated by the Member_ID foreign key) and search terms table 560 (as indicated by the Term_ID foreign key). The Member_Search_Terms table 566 indicates search terms that are used (e.g., with a defined measure of uniqueness or predominance) by a member.

In some embodiments, database schema 500 is a schema for a database stored by memory 202, for a database that is local to server 200 (e.g., a local database 260), and/or for a database that is remote to server 200 (e.g., remote database 262). In some embodiments, a subset of the above identified schema objects (e.g., tables, columns, relationships, primary keys, and/or foreign keys) are stored. Furthermore, additional schema elements not described above may be stored.

FIGS. 6A-6F illustrate event user interfaces, in accordance with some embodiments. For example, the event user interfaces 310 of FIGS. 6A-6F are graphical user interfaces that are displayed on output device 358 (e.g., a display) of client device 300.

Figure 6A:
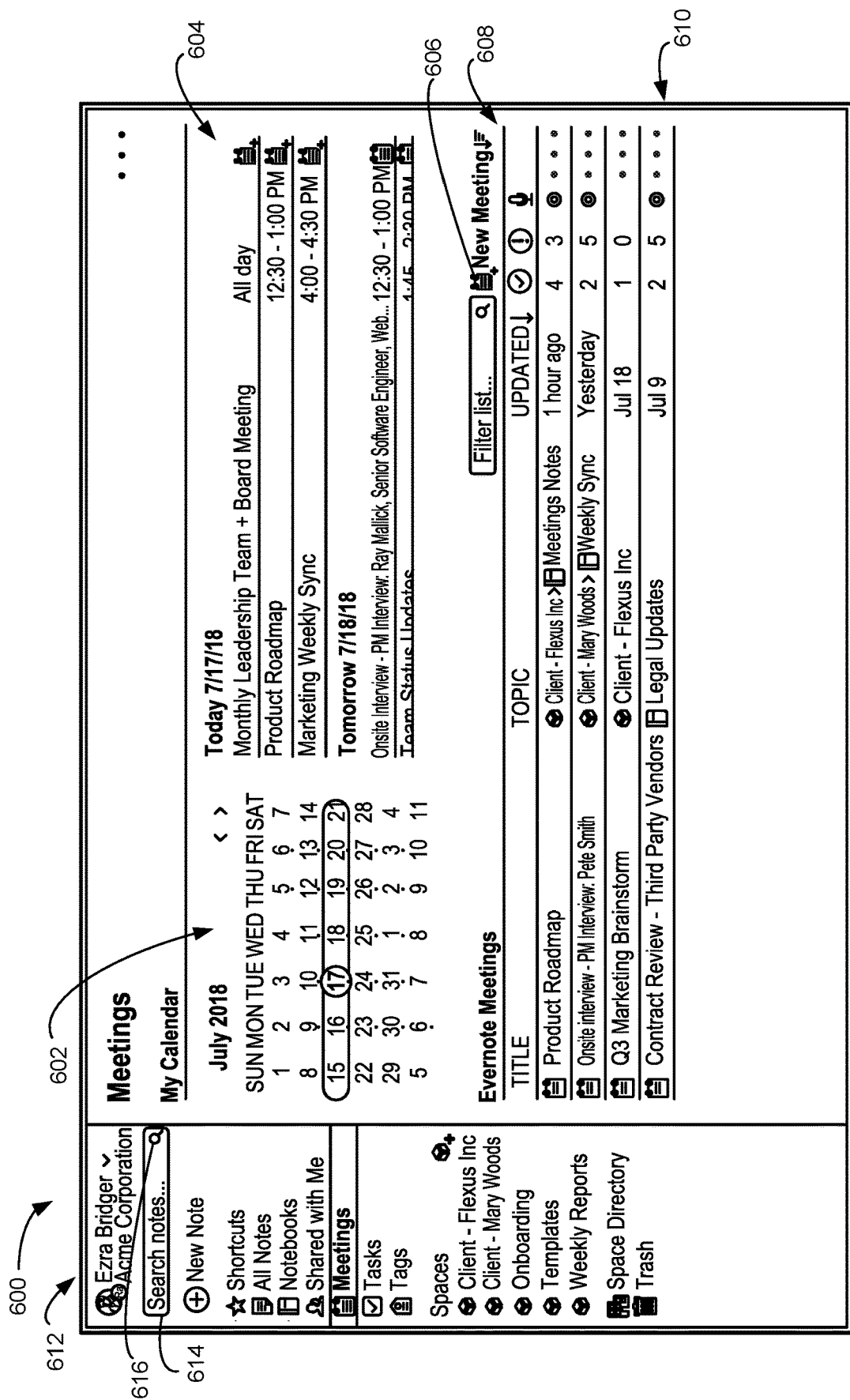

FIG. 6A shows an event summary page 600 of an event user interface 310, in accordance with some embodiments. Event summary page 600 includes a calendar 602 indicating dates on which events 410 are scheduled to occur and an event list 604 providing detailed information (e.g., an Event_Description as described with regard to events table 530) about scheduled events. By selecting new meeting control 606, a user can access an interface for manually generating a new event. However, providing input for generating a new event action is time consuming for users. The Task-Based Action Generation section below describes operations that cause an action to be automatically generated, reducing the number of inputs required for a user to create a meeting event.

Event summary page 600 includes a past event summary section 608 with summary information for past events. For example, past event entry 610 indicates an event title (e.g., an Event_Title stored in events table 530), a topic (e.g., an Event_Description stored in events table 530), a time at which the event was updated (e.g., an Event_Time stored in events table 530), a count of action items (as indicated by the checkmark icon), a count of decision items (as indicated by the exclamation point icon), and availability of media data (as indicated by the microphone icon, e.g., Event_Media stored in events table 530).

In some embodiments, user interfaces of the content management application 306, such as event summary page 600, include a navigation region 612 that includes links (e.g., "All Notes" (content item entries stored in content items table 508), "Meetings" (event entries stored in events table 530), "Tasks" (task entries stored in task table 536), "Spaces" (project entries stored in project table 505), etc.) for navigating to user interface pages related to the indicated link target.

In some embodiments, navigation region 612 includes a search input field 614 that receives search query input. Selection of search control 616 causes a search user interface to be displayed, as described further with regard to FIGS. 14-17.

Figure 6B:
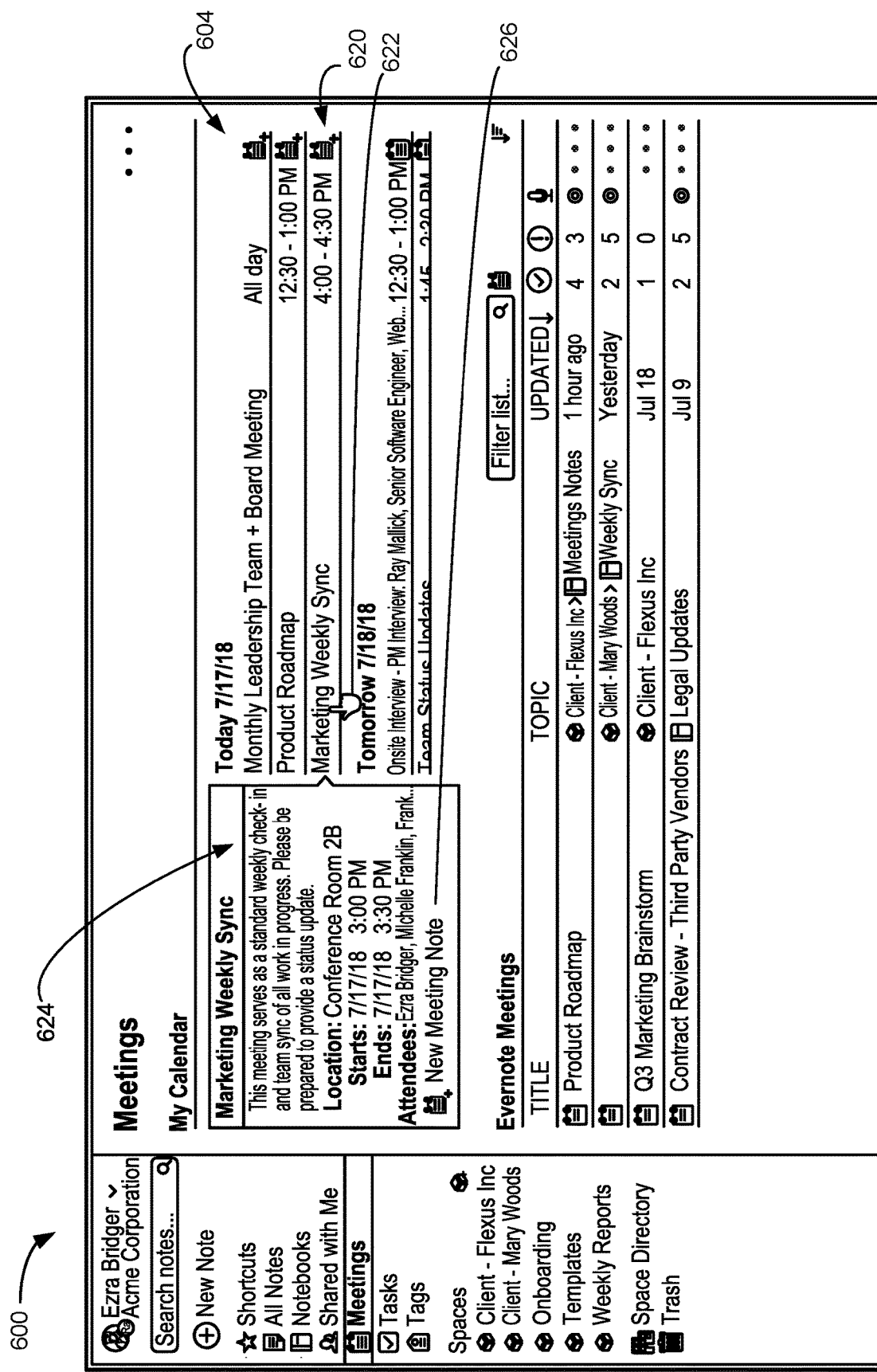

As shown in FIG. 6B, in response to an input at a location that corresponds to an event 620 ("Marketing Weekly Sync") listed in event list 604, as illustrated by pointer icon 622, a meeting detail region 624 is displayed (e.g., overlaying event summary page 600). The meeting detail region 624 includes event information (e.g., information stored in events table 530 (e.g., Event_Title, Event_Date, Event_Time, Event_Location, and/or Event_Description) and information accessible via Event_Members table 534 (e.g., Member_Name from members table 506 of members associated with the event)). A control 626 displayed in the meeting detail region 624 allows creation of a new meeting note.

Figure 6C:
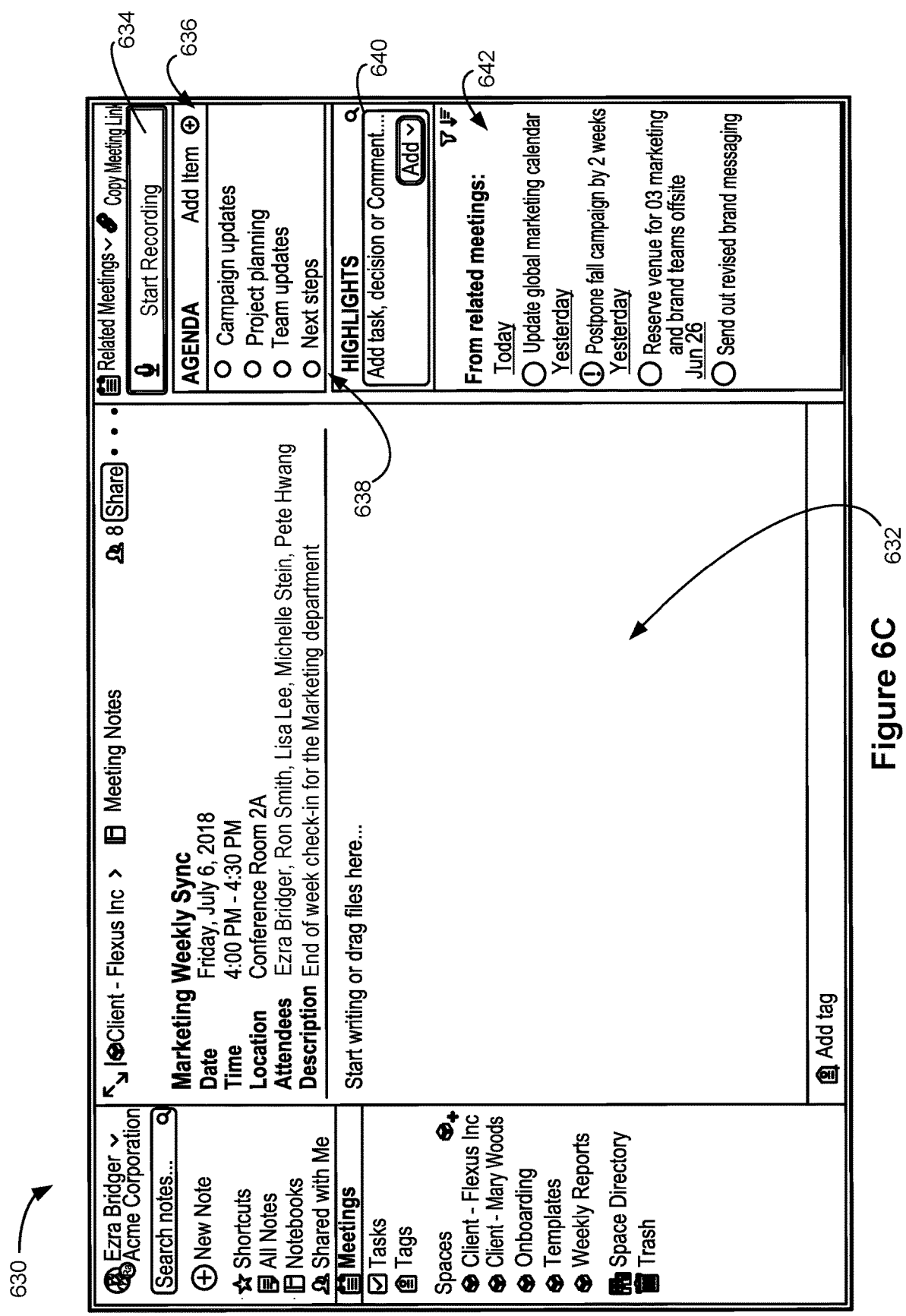

FIG. 6C illustrates a meeting note page 630 for event 620. In some embodiments, meeting note page 630 is displayed in response to input detected at a location that corresponds to control 626. Meeting note page 630 includes a meeting note input region 632 (e.g., to receive text input, documents, images (e.g., whiteboard images) or other event content associated with an event). For example, meeting note page includes content stored in Event_Content table 532. In some embodiments, meeting note page 630 includes a control 634 for initiating media capture 312 (e.g., using an input device 360, such as a camera and/or microphone, of client device 300). An agenda 636 (e.g., including a set of tasks 408) is shown in meeting note page 630. In some embodiments, the agenda includes controls as indicated at 638 for indicating a currently discussed task (e.g., for providing a visual indication of when the task was discussed relative to a representation of captured media for the event). However, requiring users to provide input indicating when a task was discussed may result in incomplete or inaccurate tracking of discussion of agenda items if input is not provided at the correct point in time. The Event Transcription Presentation section below describes automatic determination of time frames in captured media for an event that correspond to discussion of agenda items. Automatic determination of discussion of agenda items reduces the number of inputs required for agenda items to be visually distinguished in a representation of the captured media.

Meeting note page 630 includes an input region 640 that is used to generate task content (e.g., for storage by tasks table 536) and a task display region 642 that displays generated task content (e.g., task content input via input region 640 and/or tasks that are automatically generated based on meeting content). In some embodiments, one or more tasks are automatically generated based on analysis of media captured during an event. For example, captured media is analyzed to determine if a statement made during an event corresponds to a decision item (e.g., "Susan is going to review and let Alan know whether we will move forward") or an action item (e.g., "Luis will prepare the presentation").

Figure 6D:
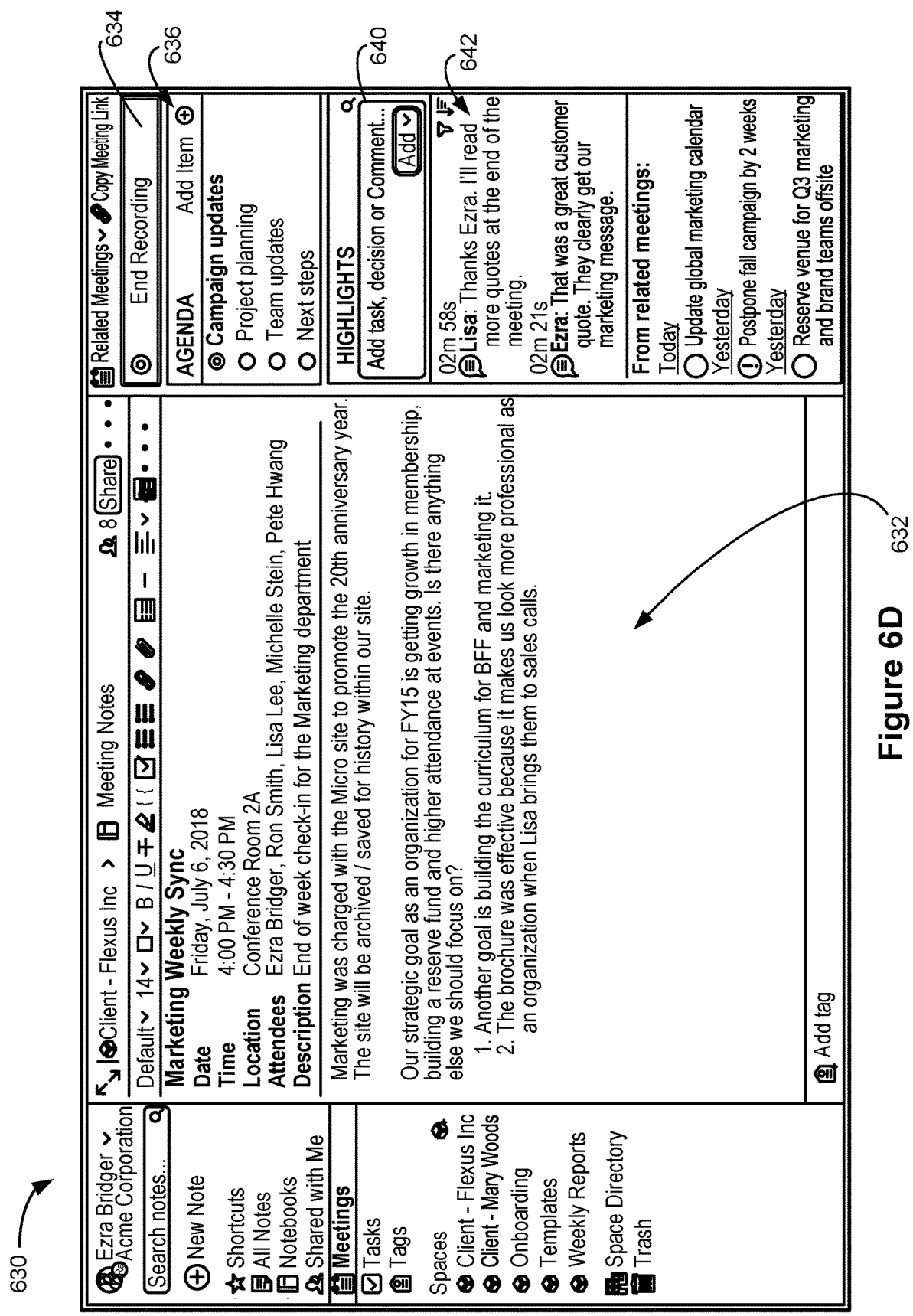

FIG. 6D illustrates a mid-event state of meeting note page 630. In FIG. 6D, meeting note content has been input in meeting note input region 632. Media capture is in progress, as indicated by the state of media capture control 634.

FIG. 6E illustrates a post-event state of meeting note page 630. In FIG. 6E, additional meeting note content, including a white board image, has been input in meeting note input region 632. Media capture control 634 has ceased to be displayed (e.g., in response to an input detected at a location that corresponds to media capture control 634 while the media capture is in progress) and a captured media region 650 that includes a representation 652 of the captured media data is displayed. Representation 652 is, for example, a waveform representing captured audio as described further below in the Event Transcription Presentation section. Captured media region 650 includes a playback control 654 for initiating playback of the captured media. Representation 652 is marked, as shown at 656, to visually distinguish portions of the captured media that correspond to agenda items (e.g., as described further below with regard to FIGS. 14-17).

Figure 6F:
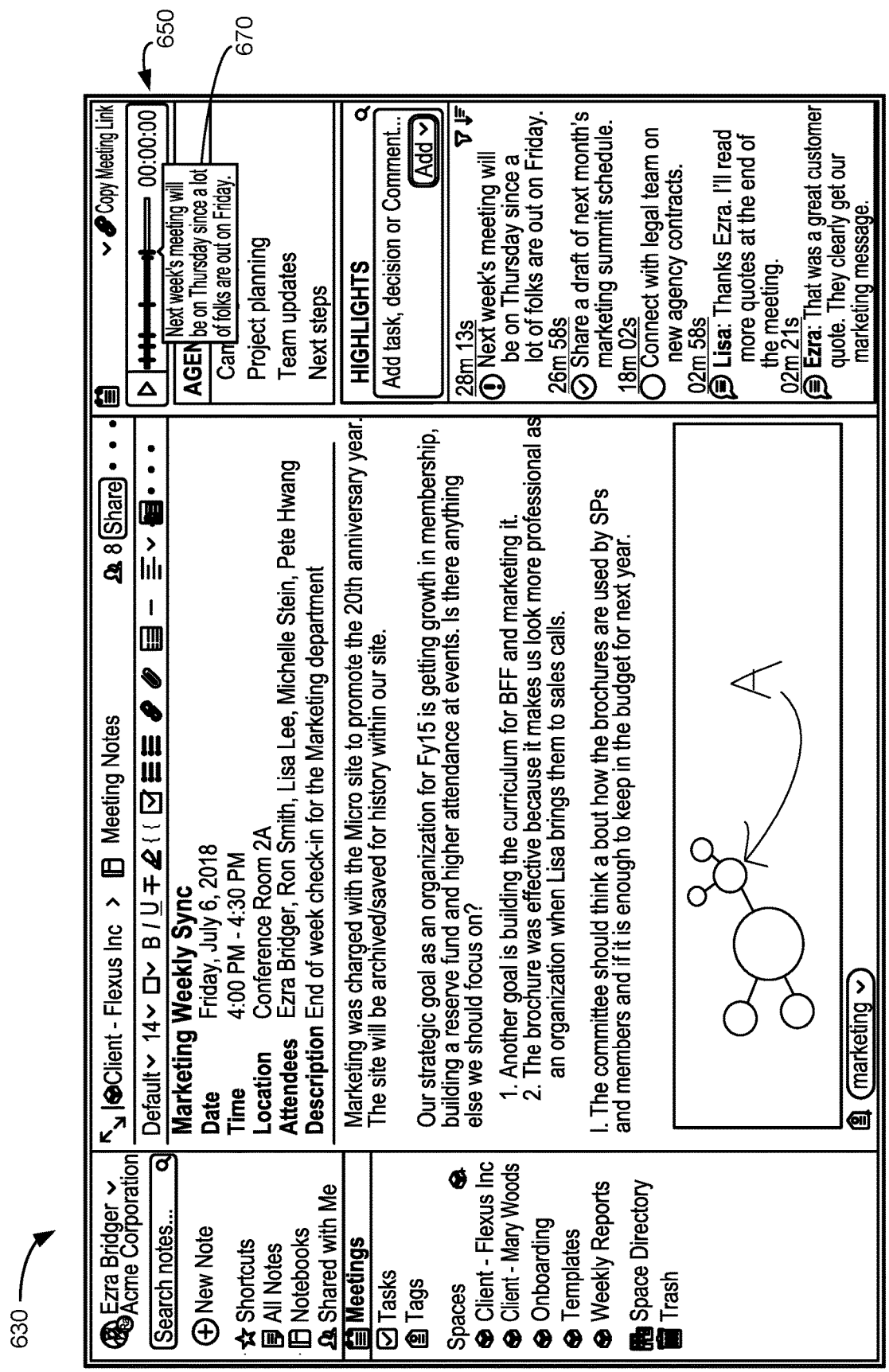

As shown in FIG. 6F, in response to input detected at a location that corresponds to a marker 656, text 670 that corresponds to a portion of the captured media that corresponds to an agenda item is displayed.

Task-Based Action Generation

As a milestone associated with a task approaches a current point in time (e.g., is approaching or has passed without an indication of completion), it may be beneficial for people associated with the task to have a meeting to discuss task status. However, scheduling a meeting typically requires a user to manually provide input indicating various aspects of the meeting, in addition to determining the people that need to be invited to the meeting. If a user does not remember to schedule a meeting associated with a task, a substantial amount of time may pass before the missed milestone is addressed. There is a need for, based on stored information indicating how members of an organization are associated with tasks (e.g., as described with regard to database schema 500), automatically prompting generation of an action (e.g., a meeting to discuss a task). By automatically and/or semi-automatically generating an action based on information (e.g., a milestone) associated with a task, embodiments described herein reduce the amount of user input and time required to arrange for an action to occur.

Figure 7:
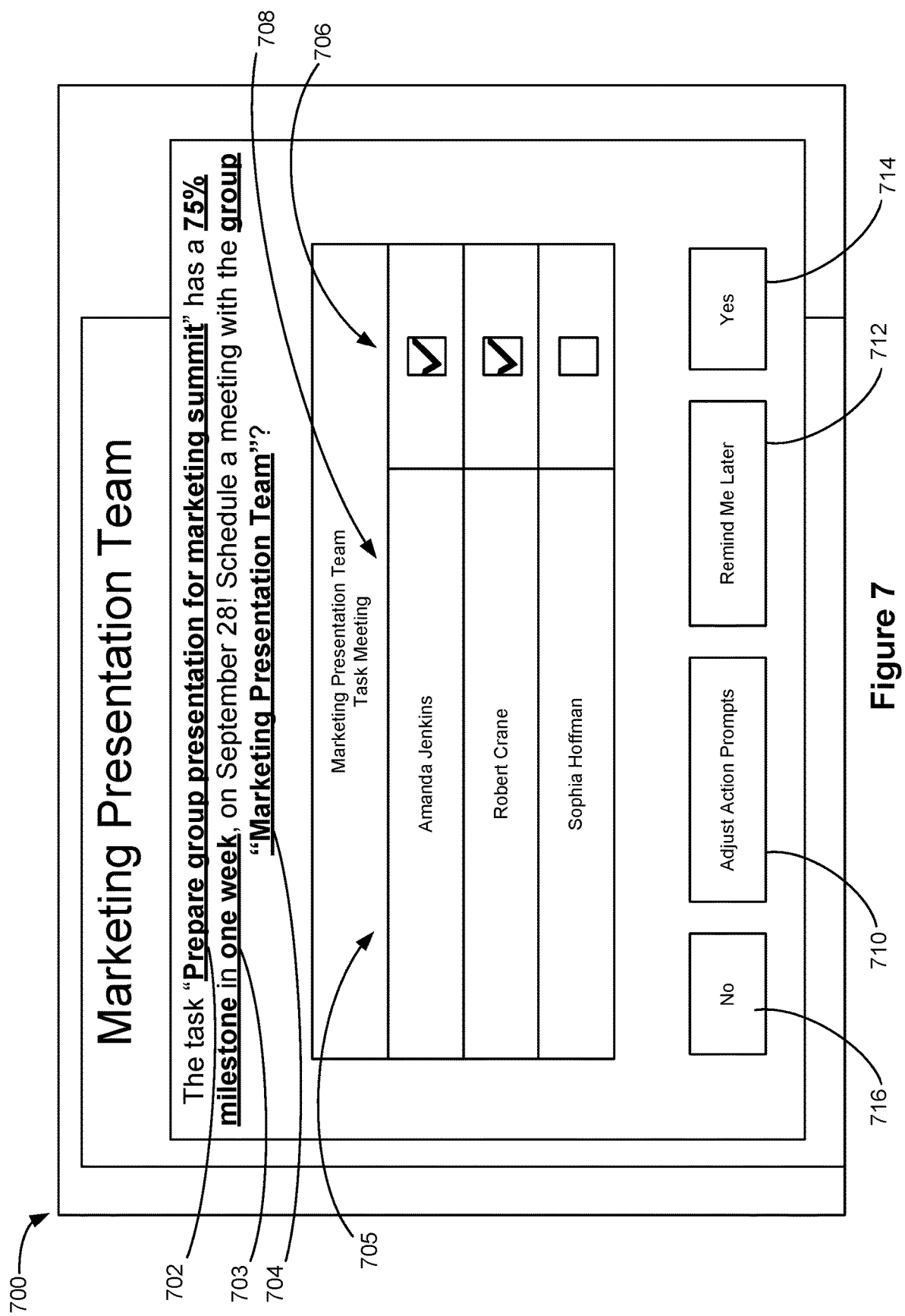
FIGS. 7-8 are exemplary user interfaces for task-based action generation, in accordance with some embodiments.
Figure 8:
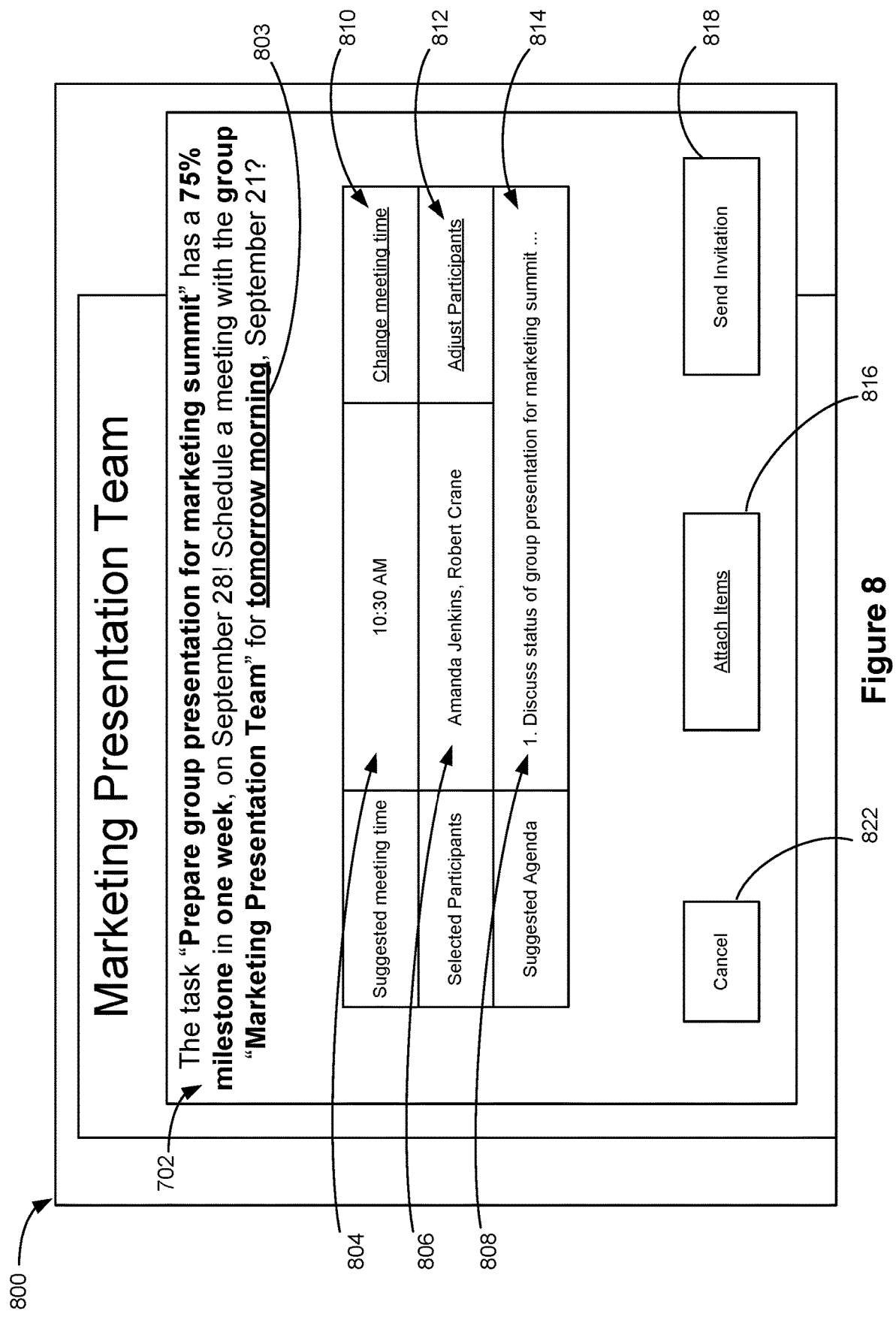

FIGS. 7-8 are exemplary graphical user interfaces (e.g., event user interfaces 310) illustrating task-based action generation. Action prompt user interface 700 includes information for generating an action (e.g., an event 410, such as a meeting) based on a task 408. Action prompt user interface 700 includes an indication of eligible action participants (e.g., members that are associated with the task, such as members that are responsible for completing the task).

In some embodiments, the prompt user interface 700 includes identifying information 702 for the task ("Prepare group presentation for marketing summit"), information 703 associated with a milestone of a task 408 (e.g., "75% milestone in one week, on September 28!"), information 704 indicating members and/or a division associated with a task (e.g., "Marketing Presentation Team"), and identifying information 705 for eligible action participants (e.g., Amanda Jenkins, Robert Crane, and Sophia Hoffman). Based at least upon the status of the milestone, the action prompt interface 700 is displayed to prompt a user to generate an action. A set of controls 706 enable selection of eligible participants for the action. The prompt 700 may include additional controls that, when selected, cause client device 300 to perform various operations. For example, in response to detecting an input at a location that corresponds to control 710, client device 300 displays a user interface for adjusting action prompts (e.g., allowing a user to specify whether action prompts are displayed before a milestone date or after a milestone date and/or to specify amount of time between a milestone date and display of an action). Additional controls include a rejection control 716 for rejecting the suggestion to generate an action, an "Adjust Action Prompts" control 710 for adjusting one or more parameters (e.g., amount of time before milestone end date at which prompt 700 is displayed, amount of time after milestone end data at which prompt 700 is displayed and/or milestone completion rate threshold below which prompt 700 is displayed) that cause prompt 700 to be displayed, a "Remind me Later" control 712 that causes the prompt to be redisplayed (e.g., after a predefined or user-selected period of time), and an acceptance control 714 (e.g., for generating the action or for proceeding to an action confirmation user interface 710)

FIG. 8 shows an exemplary action confirmation user interface 800 including a suggested meeting date 803, suggested meeting time 804, selected participants 806, and a suggested agenda 808. In some embodiments, suggested meeting time 804 is determined based on a pre-defined preference (e.g., provided via user input or learned from past schedule meetings). In some embodiments, suggested meeting time 804 is determined based on stored schedule information of the selected eligible action participants (as selected via input at controls 706). In some embodiments, suggested agenda 808 is automatically generated based at least in part on information associated with the task (e.g., as indicated by task identifying information 538). The notification may include control 810 for changing the suggested meeting time, control 812 for adjusting (e.g., adding and/or removing) meeting participants, and control 816 for adding content items to generated action information (e.g., automatically adding content items that are associated with: the selected eligible participants, the task that was the basis for displaying the prompt, and/or a project of which the task is a part). For example, the added content items are stored as event content as described with regard to Event_Content table 535. Control 818, when activated, causes action information to be transmitted to the selected eligible action participants. Control 822, when activated, causes a cancellation action (e.g., ceasing to display action confirmation user interface 800 and/or redisplaying prompt user interface 700).

Figure 9:
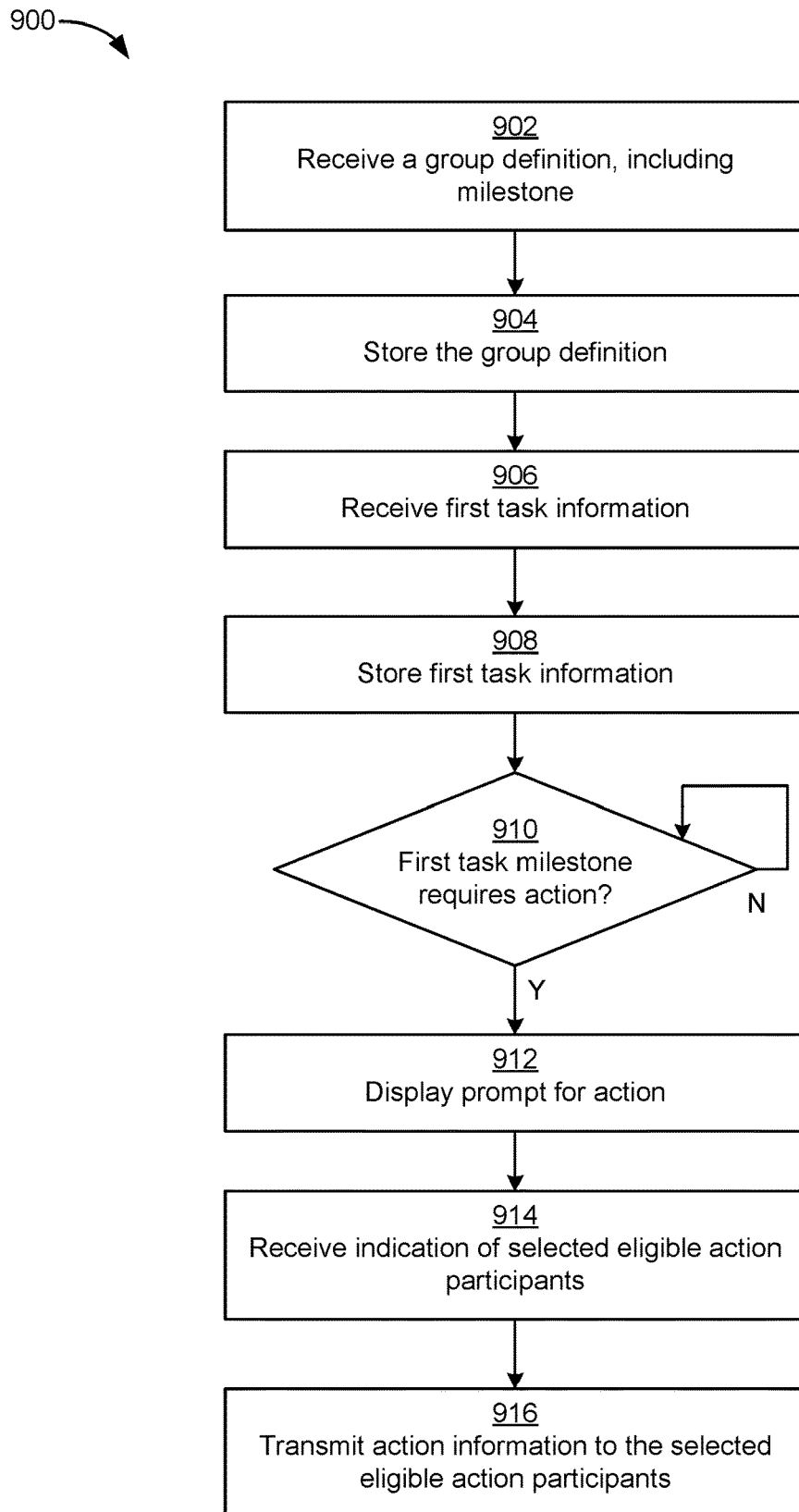
FIG. 9 is a flow diagram illustrating a method for generating task-based actions, in accordance with some embodiments.

FIG. 9 is a flow diagram illustrating a method 900 for task-based action generation in accordance with some embodiments. The method 900 is performed at a device, such as server 200. For example, instructions for performing the method 900 are stored in the memory 202 and executed by the processor(s) 252. In some embodiments, part or all of method 900 is performed at a client device 300 (e.g., instructions for performing part or all of the method 900 are stored in memory 304 and executed by processor(s) 352).

In some embodiments, the device receives (902) (e.g., from a client device 300) a definition of a group that includes identifying information for a plurality of group members associated with a group activity (e.g., a task 408 as described with regard to FIG. 4 and tasks table 536 of FIG. 5) and the definition of the group includes a milestone (e.g., as described with regard to milestones table 542). For example, the definition of the group is received via user input (e.g., user input entered on a client device 300 and transmitted to server 200 for storage by a database as described with regard to FIGS. 5A-5C). In some embodiments, the plurality of group members are members of an organization 402, members of a division of an organization (e.g., as indicated in Division_Members table 512), members associated with a project, and/or members associated with a task (e.g., as described with regard to Task_Members table 540). For example, the identifying information includes data entries that correspond to the Member_ID column of Task_Members 540.

In some embodiments, the definition of the group includes one or more content items (e.g., content items 508, FIG. 5A) corresponding to the group (e.g., as described with regard to FIG. 8).

In some embodiments, group members without action authority (e.g., as defined in Member_Role of members table 506, FIG. 5A) have limited and/or no access to action information. For example, a group may include members assigned to a specific task and other members who are not assigned to the task. The group members assigned to the task may have action authority and additionally have access to action information. The other group members not assigned to the task may have limited or no access to action information (e.g., be closed off from viewing, downloading, and/or editing the action information). In some embodiments, eligible participants for an action are determined in accordance with action authority and/or access permissions defined for one or more members (e.g., members associated with a task that is the basis for generating an action).

In some embodiments, the device determines one or more eligible content items (e.g., content items 508, FIG. 5A) that are a subset of the content items corresponding to the action and the displayed prompt 700 includes the one or more eligible content items. For example, the prompt for the action includes attachments of meeting/action notes for the task created by a group member who is also an eligible action participant.

In some embodiments, the first task was generated (e.g., automatically or in response to user input) during a prior action (e.g., previously decided action item from last week's meeting). For example, a group member logged the task into the meeting UI (e.g., input region 640, FIG. 6D). In another example, the system created the task based on an analysis of the meeting transcript (e.g., a speaker stated, "Chuck will handle development of the presentation for the next sales meeting").

The device stores (904), by a storage device, the group definition. For example, event management module 208 stores group definition information in Task_Members table 540.

The device receives (906) first task information for the first task (e.g., an action item, a decision item, a meeting agenda item, and/or a deliverable) that corresponds to the group, wherein the first task information includes a milestone that corresponds to the first task and identifying information for the first task. For example, event management module 208 stores task information in tasks table 536 and milestone information in milestones table 542. In some embodiments, the first completion date is a due date and/or time, a date from a series of due dates associated with the task, and/or a range of dates that correspond to the task.

In some embodiments, the first task information (e.g., Task_ID of tasks table 536, FIG. 5B) identifies at least one group member associated with the first task and eligible action participants include the at least one group member (discussed in more detail below).

In some embodiments, the action information includes an agenda (e.g., Event_Agenda of events table 530, FIG. 5B) that is automatically generated based on the first task information. For example, the task information includes sub-tasks with sub-milestones, and the agenda is automatically generated based on the statuses of the sub-tasks and sub-milestones. In another example, a project includes multiple tasks and all related tasks from the project are automatically input into the agenda. In some embodiments, only the tasks that have not been started and/or are incomplete are automatically input into the agenda.

In some embodiments, the agenda (e.g., Event_Agenda of events table 530, FIG. 5B) is automatically generated based on eligible action participants. For example, all tasks associated with the eligible action participants are included in the agenda.

In some embodiments, generating the agenda includes determining at least one task dependency associated with the first task (e.g., a parent task that depends on the task or a child task on which the task depends) and including, in the agenda, the first task and a second task that has a task dependency relationship with the first task.

The device stores (908) by the storage device, the first task information. For example, event management module 208 stores task information in Task_ID table 536.

At a time that corresponds to the milestone, the device determines (910) a milestone status. For example, milestone status information is stored in milestones table 542, FIG. 5B. A prompt is displayed (or not displayed) in accordance with a determination of the milestone status. For example, in accordance with a determination, based on the determined milestone status, that an action is required, the flow proceeds to operation (912) In accordance with a determination that no action is required, the flow returns to operation (910).

In some embodiments, a milestone status is determined (e.g., by event management module 208 using information stored in milestones table 542) using a milestone status, time remaining to milestone end date, remaining time until milestone end date, rate of execution, and/or percentage completion. For example, a prompt is displayed in accordance with a determination that prompting criteria are met (e.g., a task milestone has not been completed, a remaining time until a milestone completion date is below a predetermined amount, a time after a completion date is above a predetermined amount, a rate of execution of the first task is below a threshold value (e.g., based on a user defined or automatically determined rate value), and/or a percentage completion amount of the milestone is below a predetermined amount). In some embodiments, no prompt is displayed in accordance with a determination that prompting criteria are not met. In some embodiments, the milestone status is determined periodically, in response to user input, and/or automatically at a time that corresponds to the milestone (e.g., within a week of the date that the milestone was established).

In some embodiments, the first task includes a set of subtasks. In some embodiments, determining the milestone status (e.g., by event management module 208) includes determining a completion status of at least one subtask in the set of subtasks. For example, it may be desirable to generate a prompt for an action based on a number and/or proportion of a set of subtasks that have been completed (e.g., if fewer than a threshold number and/or proportion of the subtasks have been completed at the time that corresponds to the milestone, a prompt is displayed for generating an action).

At operation 912, the device displays (912) a prompt (e.g., prompt 702, FIG. 7 and/or action confirmation user interface 800) for generating the action (e.g., action generation 210, FIG. 2). The displayed prompt includes identifying information for the first task and for eligible action participants (e.g., users associated with the task, users that have participated in meetings that are relevant to the task and/or the group, users associated with content that corresponds to the task and/or the group, and/or users who have performed a search relevant to the task and/or group) where the eligible action participants include at least a subset of the group members. In some embodiments, "users" are users of a group management system (e.g., Evernote). In some embodiments, "users" are associated with (e.g., invitees) of actions (e.g., group meeting events) managed by the group management system.

In some embodiments, the eligible action participants are determined in accordance with access parameters (e.g., Member_Role of members table 506, FIG. 5A) defined for group members.

In some embodiments, the action is updated based on a detected change of the milestone status (e.g., input indicating that a milestone date or status has changed). For example, the action is moved to a different date and/or time based on a change of the milestone status. In some embodiments, the prompt (e.g., prompt 702, FIGS. 7-8) to generate the action is updated based on a detected change of the milestone status. For example, the prompt to generate the action (e.g., meeting invite) is updated based on a milestone status change (e.g., a group member recently marked the task as completed).

The device receives (914) an indication of selected eligible action participants. For example, as shown in FIG. 7, a user selects Amanda Jenkins and Robert Crane as eligible action participants to be invited to the action and Sophia Hoffman is an unselected eligible participant.

The device transmits (916), to the selected eligible action participants, action information (e.g., including a group event invitation and/or calendar event) corresponding to the action. For example, as discussed with respect to FIG. 7, action information is transmitted information to the eligible action participants in accordance with a determination that a user has selected option 714 (e.g., option "Yes").

In some embodiments, the device automatically includes eligible content items in the action information transmitted to the selected eligible action participants. For example, FIG. 8 shows a suggested agenda 808 that is automatically attached to the action information. In some embodiments, one or more eligible content items including an agenda are automatically sent to the selected eligible action participants. In some embodiments, one or more eligible content items including an agenda may be sent to a group member who has managerial or supervisory authority (e.g., as defined in Member_Role and/or Hierarchal_Rank of members table 506, FIG. 5A) but who is not one of the selected eligible action participants.

In some embodiments, the action is updated based on a detected change of a status (e.g., access status, availability status, position change) of one or more of the selected eligible action participants.

In some embodiments, in response to detecting a change of status of one or more action participants, the device displays a prompt to transmit updated action information. For example, if a new member is removed from or added to a group, the action prompt user interface 700 may display an updated prompt to transmit action information in accordance with the changed status. In some embodiments, a status change occurs when availability of a selected eligible participant changes (e.g., the action participant becomes unavailable during a scheduled time for an action.

In some embodiments, action information includes an action parameter determined based on stored action preference data (e.g., associated with an action, task, member, division, project, and/or enterprise).

In some embodiments, the device stores action summary data that corresponds to the action and updates the action preference data based on the action summary data. For example, the device uses machine learning to store and/or adjust stored action preference data (e.g., based on learned preferences and/or behavior regarding generation of actions). Action preference data may include a set of defined action preferences including room, time, duration, number of people, automatically inviting managers, requesting food and/or drinks information. For example, a user has a preference for starting an action (e.g., meeting) at 10:30 am on Friday mornings. This information may be saved and/or stored as action information.

Action preference data may be retrieved and/or learned based on stored action summary data and/or in response to user input (e.g., user input provided in a form). In some embodiments, a template including the action preference data is updated iteratively by a machine learning process. For example, based on a determination that six out of ten agenda items were covered during an event, action preference data is updated (e.g., to indicate that six or fewer agenda items are to be included in an agenda for a future action).

In some embodiments, action preference data is updated in response to user input. For example, at the end of an action, a prompt is displayed in the action UI asking the user for feedback regarding the meeting. The feedback may include an indication of whether the meeting length was too short, too long, or acceptable. In some embodiments, based on the received user input in response to the prompt, the stored action preference data is updated and applied to a future action. In some embodiments, updates determined based on an action are applied to action preference data that corresponds to other members associated with a task, division, enterprise, or such.

Event Transcript Presentation

A method is provided for displaying a visual representation of a group event to a user. The representation includes information about agenda items that were discussed during the group event. For example, a device captures media data, such as audio and/or video data, during the group event and creates (e.g., generates) a representation based on the captured media data. In some embodiments, the representation includes visual markers indicating one or more points (e.g., time frames) during the group event that a given agenda item was discussed. In some embodiments, the representation provides a portion of a transcription that corresponds to a portion of the representation to indicate what was presented during a given time frame. In some embodiments, the representation is interactive such that user can select (e.g., via a user input), different time frames of the representation in order to explore the group event. The method provided herein allows users to easily access information discussed during group events (e.g., meetings) even after the group event has ended.

Manually transcribing discussions about each agenda item during a group event is inefficient and prone to user error. Further, agenda items may be discussed multiple times (e.g., in multiple time frames) during the group events. Providing a user with an automatically generated representation that indicates when (e.g., during which time frames) a particular agenda item was discussed and providing more detailed information regarding what was presented (e.g., discussed) about the agenda item during the group event improves user experience by presenting the user with an improved graphical user interface for displaying and navigating stored media data. Automatically generating the representation and assigning agenda items to particular time frames of the representation improves the man-machine interface by requiring less user input (e.g., a user does not manually transcribe and organize notes from an event).

Figure 10A:
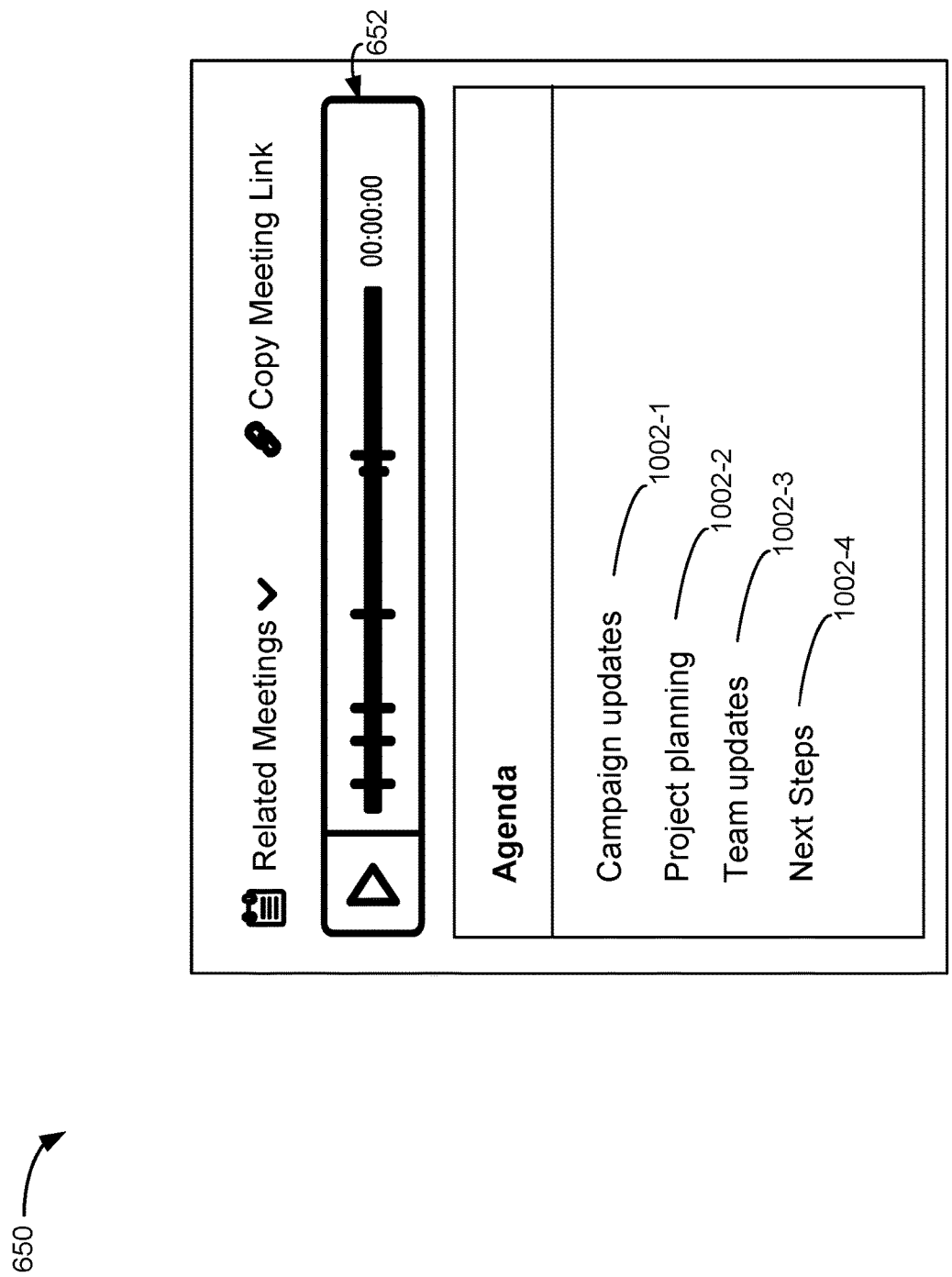
FIGS. 10A-10B illustrate a portion of an event user interface, in accordance with some embodiments.
Figure 10B:
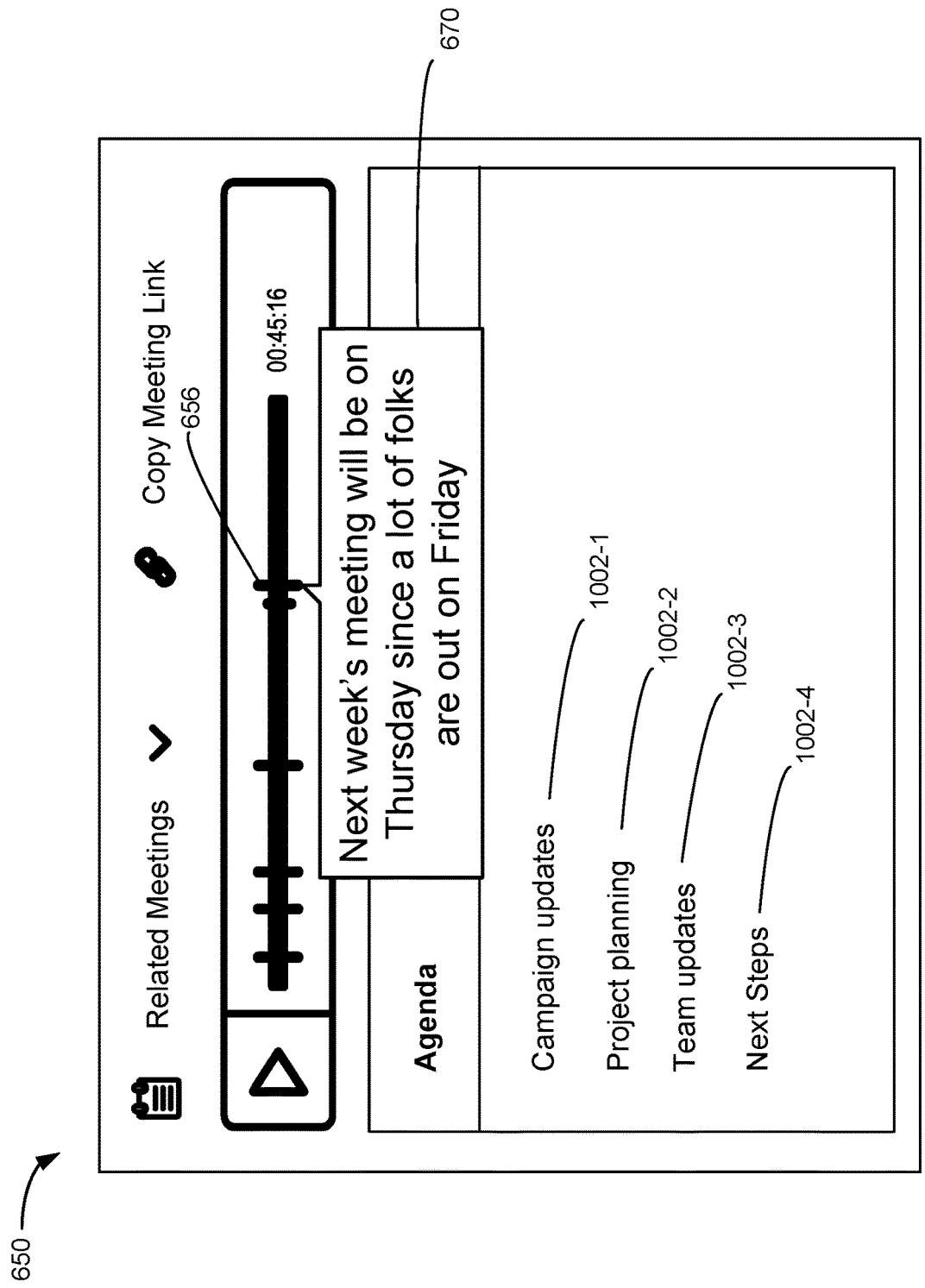

FIGS. 10A-10B are graphical user interfaces illustrating a representation of media data captured during a group event, in accordance with some embodiments. The graphical user interfaces include a region that includes a plurality of agenda items 1002, including the agenda items: "Campaign updates" 1002-1, "Project planning" 1002-2, "Team updates" 1002-3, and "Next steps" 1002-4. In some embodiments, the plurality of agenda items is generated from existing information stored by a data structure. FIGS. 10A-10B also illustrate a representation 652 of media data.

The device captures media data during the group event. For example, at the start of a group event (e.g., meeting) a user selects a control 644 as described with regard to FIG. 6C to begin media data capture. In some embodiments, the media data is captured from one or more client devices 300 (e.g., as described with regard to FIG. 1) that are located at the group event (e.g., in event space 106, such as a meeting room). In some embodiments, the media data is captured from a single device (e.g., a media presentation system). In some embodiments, the media data is captured by any media recording device, capable of receiving (e.g., capturing) and/or storing media (e.g., audio and/or video) data. In some implementations, the device capturing the media data includes audio processing capabilities (e.g., voice recognition/processing).

The representation 652 of media data is generated during and/or after the group event. In some embodiments, the representation 652 is displayed during the group event and is dynamically updated. For example, the representation 652 comprises a waveform that is generated along a timeline, where the waveform extends along the timeline as media data is captured over time.

The captured media data is converted to a searchable version of the media data. In some embodiments, the device (e.g., client device 300 and/or server 200) converts the media data during the group event (e.g., in real-time). The device uses the converted media data to analyze the progress of the group event. For example, the device determines which agenda items are being discussed during the group event, when the agenda items are discussed, creates a searchable (e.g., text) version of the captured media data, and/or displays a representation to present this information to a user. Thus, a user can easily navigate different topics (e.g., agenda items) and identify (e.g., using the representation 652) selected portions of the group event that are relevant to the user. For example, rather than a user listening to a recording of a full meeting and manually skipping through the recording, the representation breaks down (e.g., by agenda item) and displays visually distinguished portions (e.g., time frames), on a timeline, to the user, such that the user can easily identify which portions of the captured media data are relevant to that user's needs.

In some embodiments, the representation includes a plurality of markers. For example, each of the plurality of markers indicates when a new topic (e.g., a new agenda item) is being discussed. In response to receiving a user input on a marker 656, the computing device generates and displays information 670 related to the marker. For example, the information 670 comprises text that corresponds to the marker 656. The text, for example, is a transcription of audio data that was captured at the time corresponding to that marker 656.

FIGS. 11A-11E illustrate an exemplary representation of media data 652. The representation 652 shown in FIGS. 11A-11E is a waveform (e.g., audio waveform) 1000 that corresponds to audio captured during a group event. In some implementations, the representation 652 comprises a plurality of frames (e.g., video frames). The waveform 1000 (or representation 652) is generated based on media data (e.g., audio data) captured during a group event. In some implementations, the representation 652 is displayed on a timeline 1006.

Figure 11A:
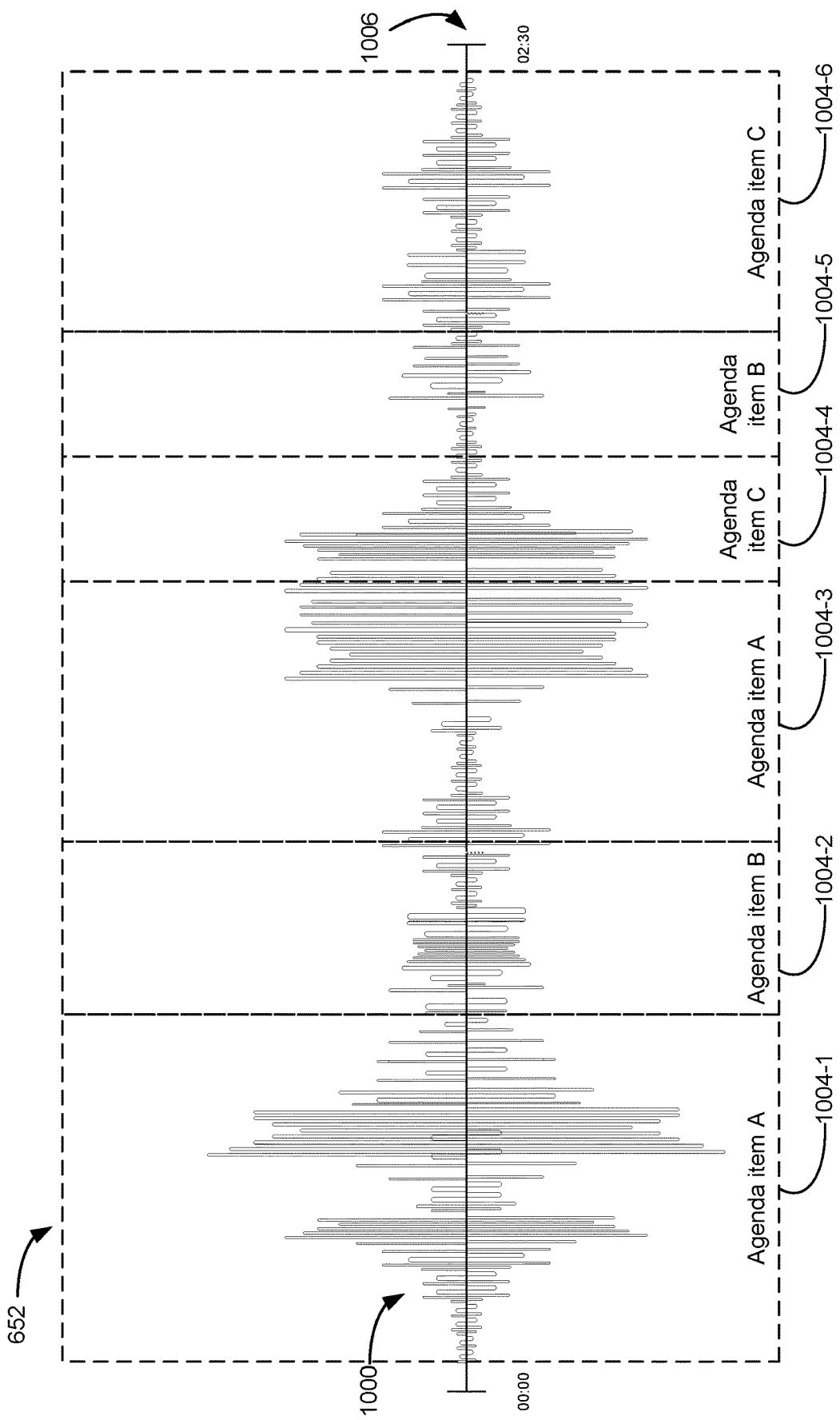
FIGS. 11A-11E illustrate representations of collected media data, in accordance with some embodiments.

FIG. 11A illustrates that portions of the representation have been determined to correspond to various agenda items. For example, a first portion of the representation 1004-1 corresponds to Agenda item A (e.g., the device determines that Agenda item A was discussed during the time frame of portion 1004-1). A second portion of the representation 1004-2 corresponds to Agenda item B. A third portion of the representation 1004-3 also corresponds to Agenda item A. Portion 1004-4 corresponds to an Agenda item C, portion 1004-5 corresponds to an agenda item B, and portion 1004-6 corresponds to Agenda item C. Thus, more than one portion of the representation 652 can correspond to a same agenda item. In some embodiments, more than one agenda item can correspond to a same portion (e.g., if two agenda items are closely related, a portion can be associated with both agenda items). In some embodiments, each portion is only associated with a single agenda item (e.g., cannot be associated with more than one agenda item).

Figure 11B:
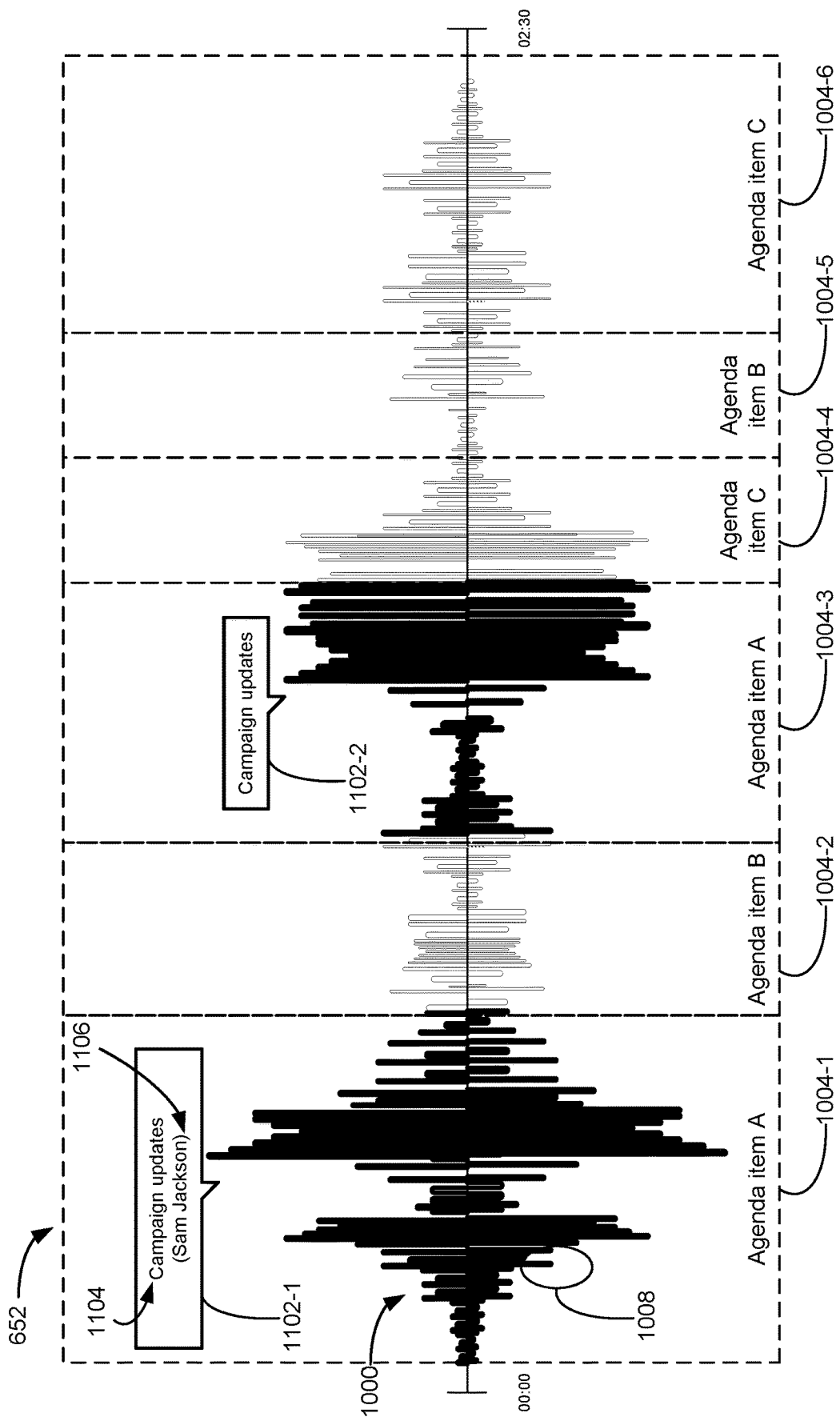

FIG. 11B illustrates an example of the device receiving a user input 1008. In some embodiments, user input 1008 comprises hovering over or selecting a portion of the representation. For example, user input 1008 corresponds to portion 1004-1, which corresponds to an Agenda item A. In response to the user input 1008, the device visually distinguishes portion 1004-1 (e.g., as shown by the emphasized/bolded waveform within portion 1004-1) compared to at least a portion (e.g., remaining portions) of the representation. For example, the waveform 1000 in portions 1004-2 through 1004-6 is not bolded in FIG. 11B. Thus, a user can easily identify the time frame (e.g., portion of the representation) in which the agenda item (selected by the user input) was discussed.

In some embodiments, in response to the user input 1008, the device displays information related to the selected portion. For example, the device displays text box 1102-1, which contains information related to Agenda item A, such as displaying the agenda item text "campaign updates" (e.g., the text corresponding to the agenda item 1002-1, FIG. 10A). In some embodiments, the device displays text comprising a transcription (e.g., determined by speech-to-text processing) of the media data that was captured during the time frame corresponding to the portion. In some embodiments, the device displays information about a person, such as the speaker of the media data during the time frame corresponding to the portion and/or a person associated with the agenda item (e.g., or task generated) corresponding to the portion.

In some embodiments, the device determines that an additional time frame (e.g., time frame corresponding to portion 1004-3) corresponds to a same agenda item (e.g., Agenda item A). In some embodiments, the device visually distinguishes (e.g., highlights) all portions 1004 that correspond to a same agenda item. For example, in response to a user input 1008 on portion 1004-1 corresponding to Agenda item A, the device determines that portion 1004-3 also corresponds to Agenda item A. In accordance with the determination that portion 1004-1 and 1004-3 correspond to Agenda item A, the device visually distinguishes both portions. For example, the device emphasizes, bolds, highlights and/or displays text boxes 1102 on both portion 1004-1 and portion 1004-3, as shown in FIG. 11B. The text boxes 1102-1 and 1102-2 may include the same text or may include distinct text. For example, both text boxes 1102-1 and 1102-2 include the Agenda item 1002-1 "Campaign updates." In some embodiments, the text boxes include distinct text, such as transcriptions indicating the media data that was captured during the respective portion.

Figure 11C:
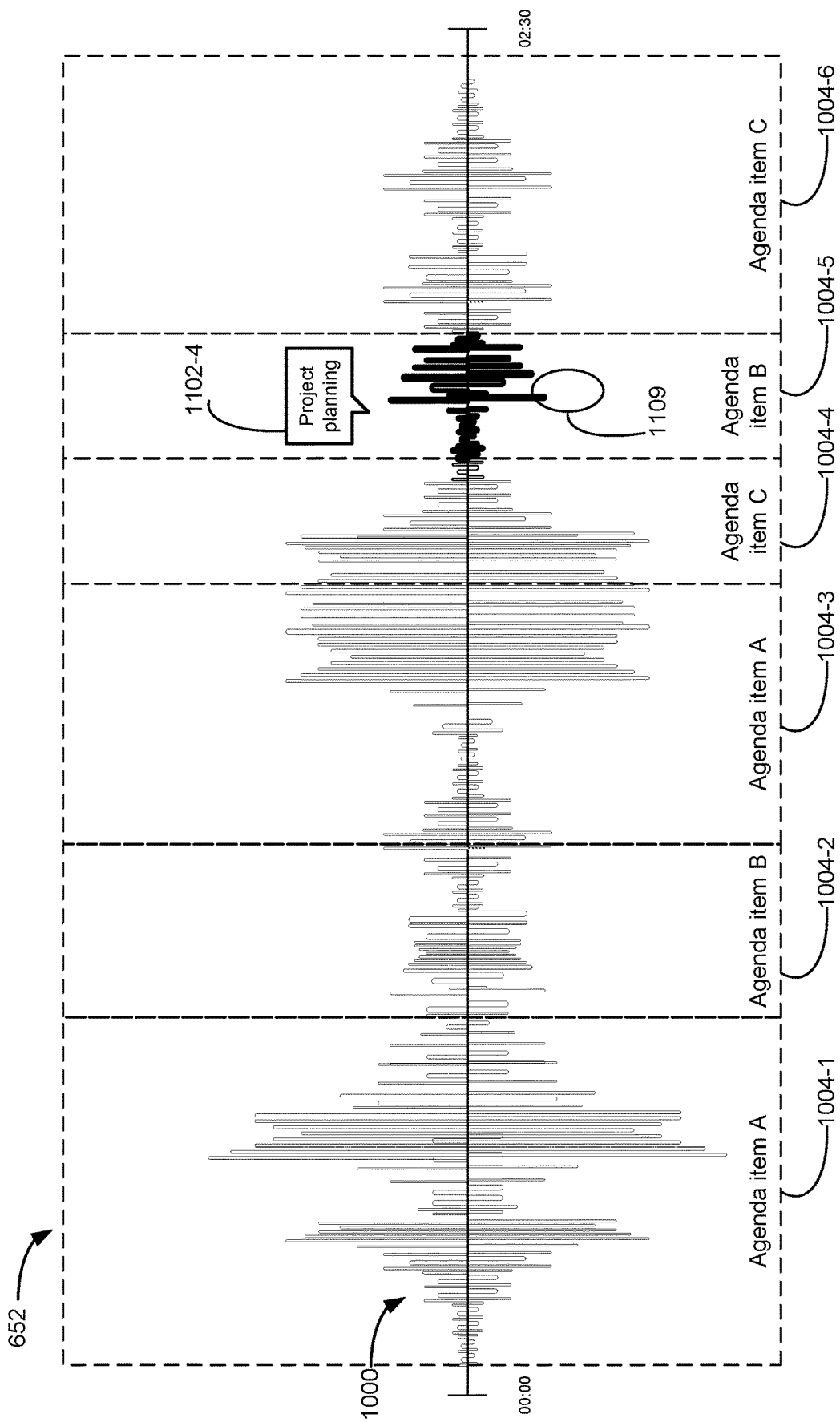

FIG. 11C illustrates another example of a user input 1109 on another portion 1004-5 of the waveform 1000. The user input 1109 corresponds to an agenda item B. Portion 1004-2 also corresponds to Agenda item B. As shown in FIG. 11C, in some embodiments, the device only visually distinguishes the portion selected by the user input 1009, in this example portion 1004-5. Here, portion 1004-5 is emphasized/bolded and a text box 1102-4 including information about the selected agenda item (e.g., "Project planning") is displayed. In some embodiments, the device does not visually distinguish the other portions (e.g., portion 1004-2) that correspond to a same agenda item (e.g., Agenda item B) as the agenda item associated with the user input.

Figure 11D:
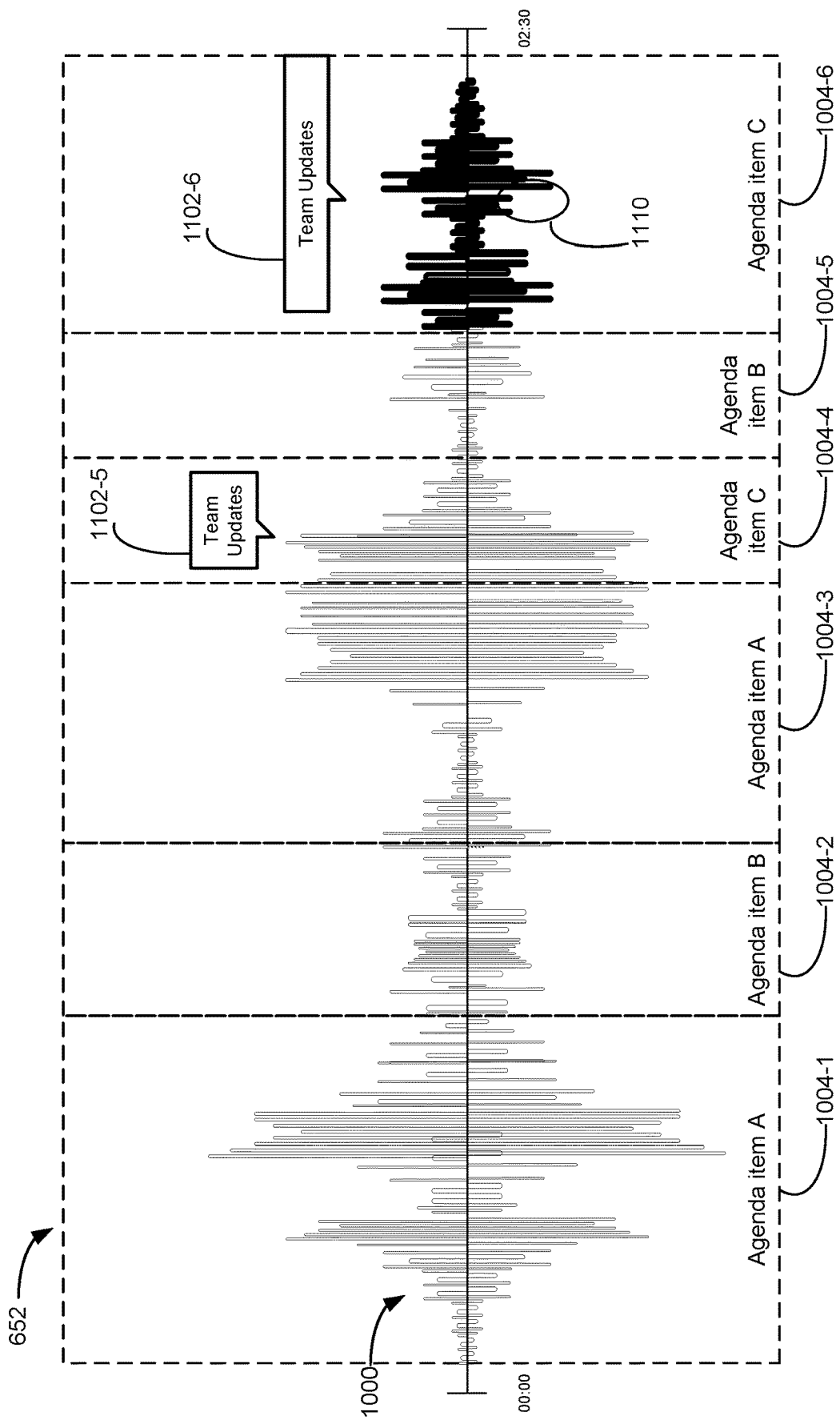

FIG. 11D illustrates another example of a user input 1110 on a portion 1004-6 corresponding to Agenda item C. In some embodiments, the device visually distinguishes the portion selected by the user input 1110 more than the other portions associated with the same agenda item. For example, as shown in FIG. 11D, the device emphasizes/bolds the waveform 1000 and displays text box 1102-6 in portion 1004-6, but only displays text box 1102-5 without emphasizing/bolding the waveform in portion 1004-4.

It is to be understood that any combination of user inputs, as described above, can be received. For example, a user can select multiple portions successively, as if moving (e.g., scrolling) through the representation 652. Further, in some embodiments, an additional user input can be received that causes the device to provide more detailed information about the portion associated with the user input. For example, a user input (e.g., hovering) over the waveform 1000 results in visually distinguishing the selected portion (as explained above with reference to FIGS. 11B-11D) and a second user input (e.g., clicking) on the waveform 1000 results in displaying more information about the selection portion (e.g., information about a speaker of the portion, a transcription of the portion, a link to a note related to the portion, etc.).

Figure 11E:
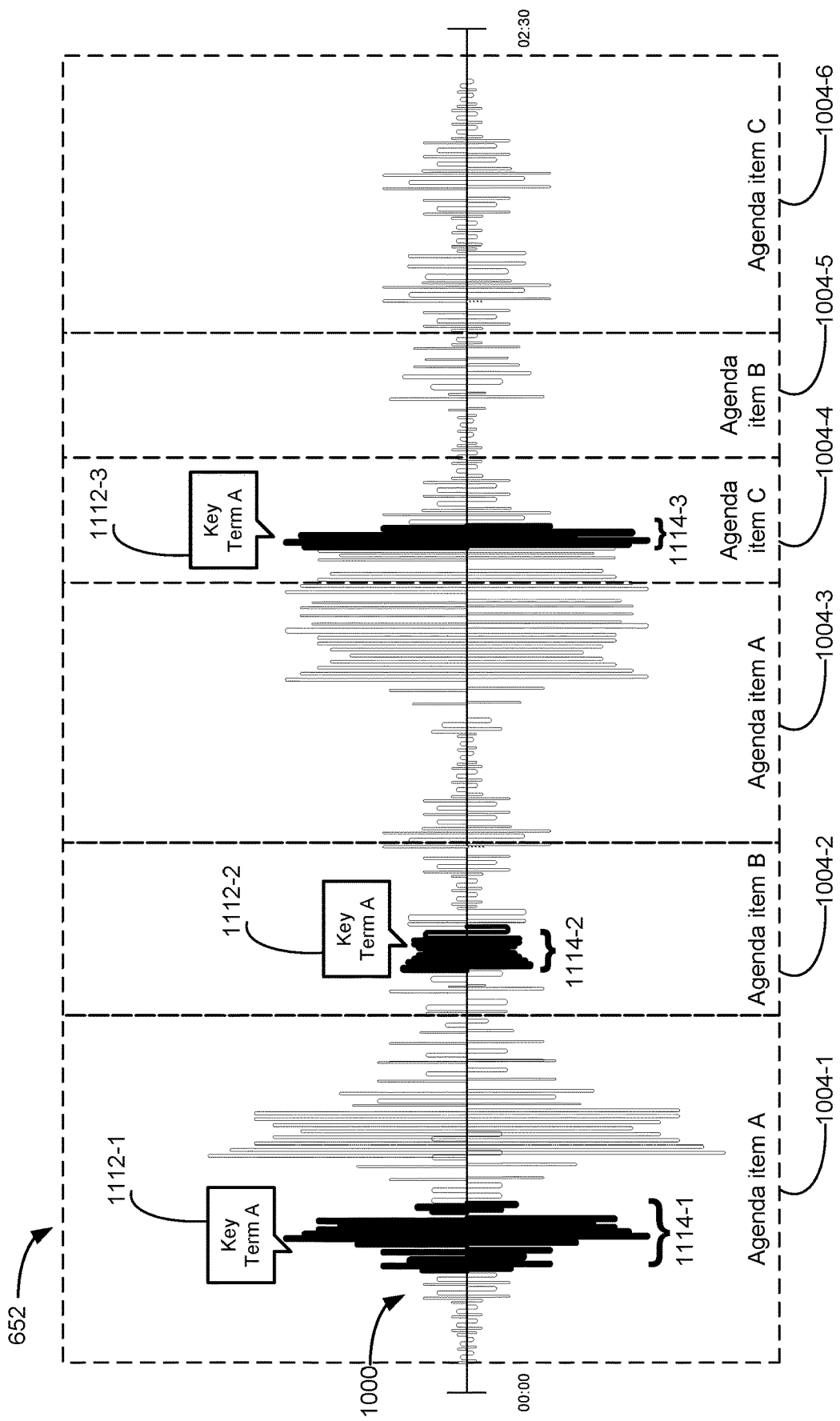

FIG. 11E illustrates a representation of captured media data in response to a search. As described with respect to FIGS. 11A-11D, a plurality of portions 1004 corresponding to distinct time frames has been identified by the device, each portion associated with an agenda item. In some embodiments, a user searches the captured media data. For example, a user inputs a key term (e.g., "Key Term A") in a search bar or other user interface element that, when activated, causes the device to search the captured media data. Thus, instead of the user identifying portions associated with a particular agenda item, as described above with reference to FIGS. 11A-11D, the user can identify time frames in the representation that are related to a key term (e.g., that does not correspond directly to a particular agenda item). In some embodiments, the key term corresponds to a person (e.g., the user searches for all time frames associated with a particular speaker). In some embodiments, the key term corresponds to a phrase or topic. In some embodiments, the key term corresponds to an agenda item.

In response to the user input corresponding to a search, the device searches the captured media data and identifies (e.g., determines) a time frame, if any, of the media data that corresponds to the key term. For example, the identified time frame does not correspond to the first portion corresponding to the first time frame associated with the first agenda item. In some embodiments, the time frame identified based on the key term comprises a sub-portion of the first time frame. For example, FIG. 11E shows the device identifies time frames 1114-1, 1114-2 and 1114-3. The device visually distinguishes the identified time frames by emphasizing/bolding/highlighting the waveform 1000 during the time frames 1114 and displaying text boxes 1112-1, 1112-2 and 1112-3. In some embodiments, the text boxes include the key term (e.g., "Key Term A"). In some embodiments, the text boxes 1112 include information related to the time frames 1114. In some embodiments, the device searches the captured media data for key terms based on how frequently the key term occurs in the captured media data.

Figure 12:
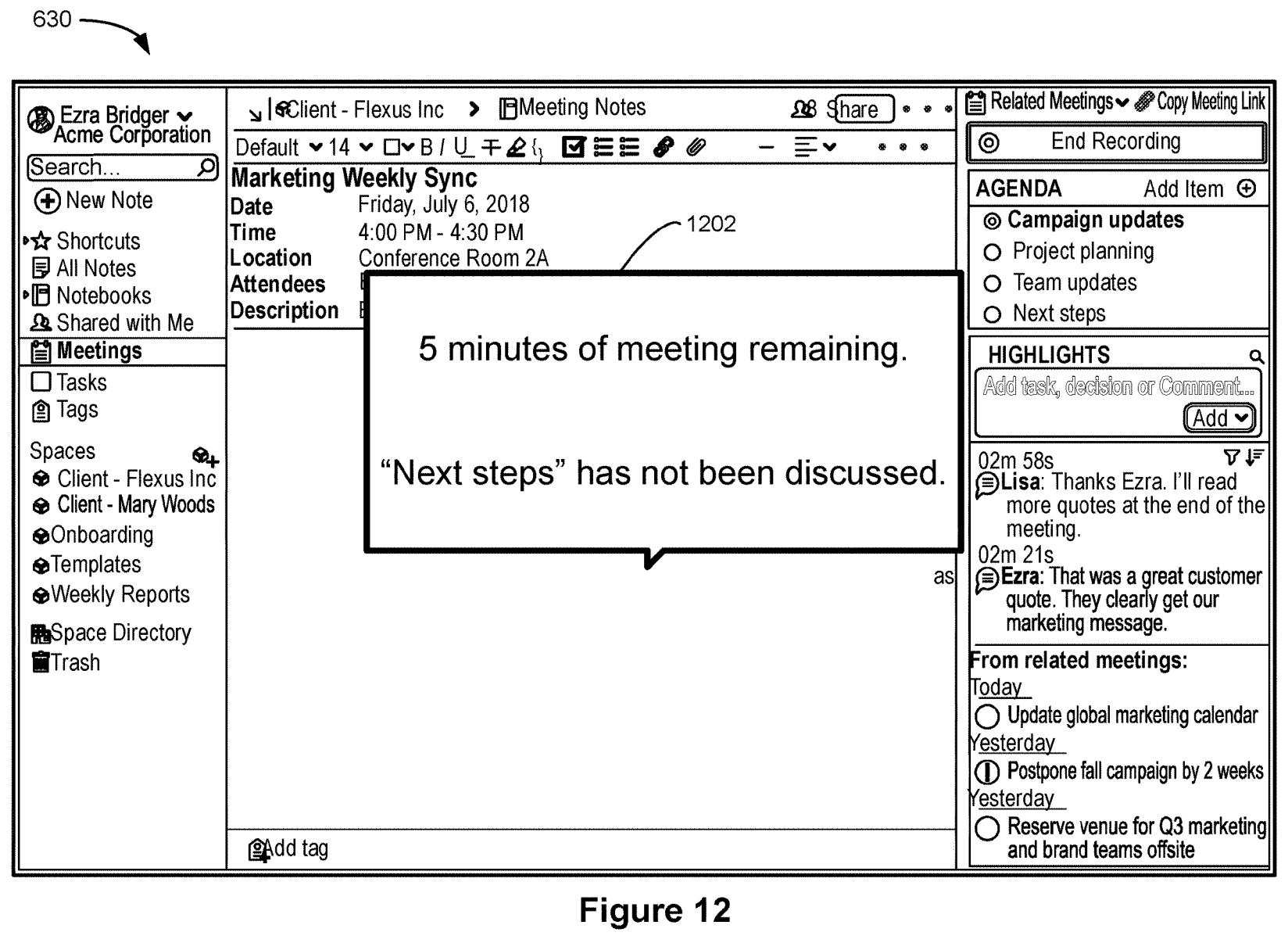

FIG. 12 illustrates a graphical user interface during an event. The graphical user interface 630 is displayed during the group event while media data continues to be captured (e.g., as indicated by the option to "end recording" user interface element 634). In some embodiments, during the event, a visual prompt 1202 is displayed during the user. In some embodiments, the visual prompt 1202 appears in response to a length (of time) of the event satisfying a threshold. For example, the visual prompt 1202 appears after 25 minutes of the event has passed. In some embodiments, the visual prompt 1202 appears in response to a determination of a threshold duration remaining with respect to a scheduled amount of time for the event. For example, for an event that is scheduled for 30 minutes, the visual prompt 1202 appears when there is a threshold duration (e.g., 5 minutes or less) of time remaining in the schedule amount of time. In some embodiments, the visual prompt 1202 appears in response to a user input (e.g., a user request).

In some embodiments, the visual prompt 1202 includes an indication of the duration of the event (e.g., how much time is remaining). In some embodiments, the visual prompt 1202 includes information related to the captured media data during the event. For example, the device determines, based on the plurality of agenda items and the captured media data, which of the agenda items, if any, had been captured (e.g., discussed) during the event and which of the agenda items, if any, had not been captured during the event. The prompt 1202 then includes information indicating which agenda items have not yet been captured. Thus, attendees of an event can easily determine, from the visual prompt 1202, how much time is remaining for the scheduled event and/or which agenda items were not yet discussed.

Figure 13A:
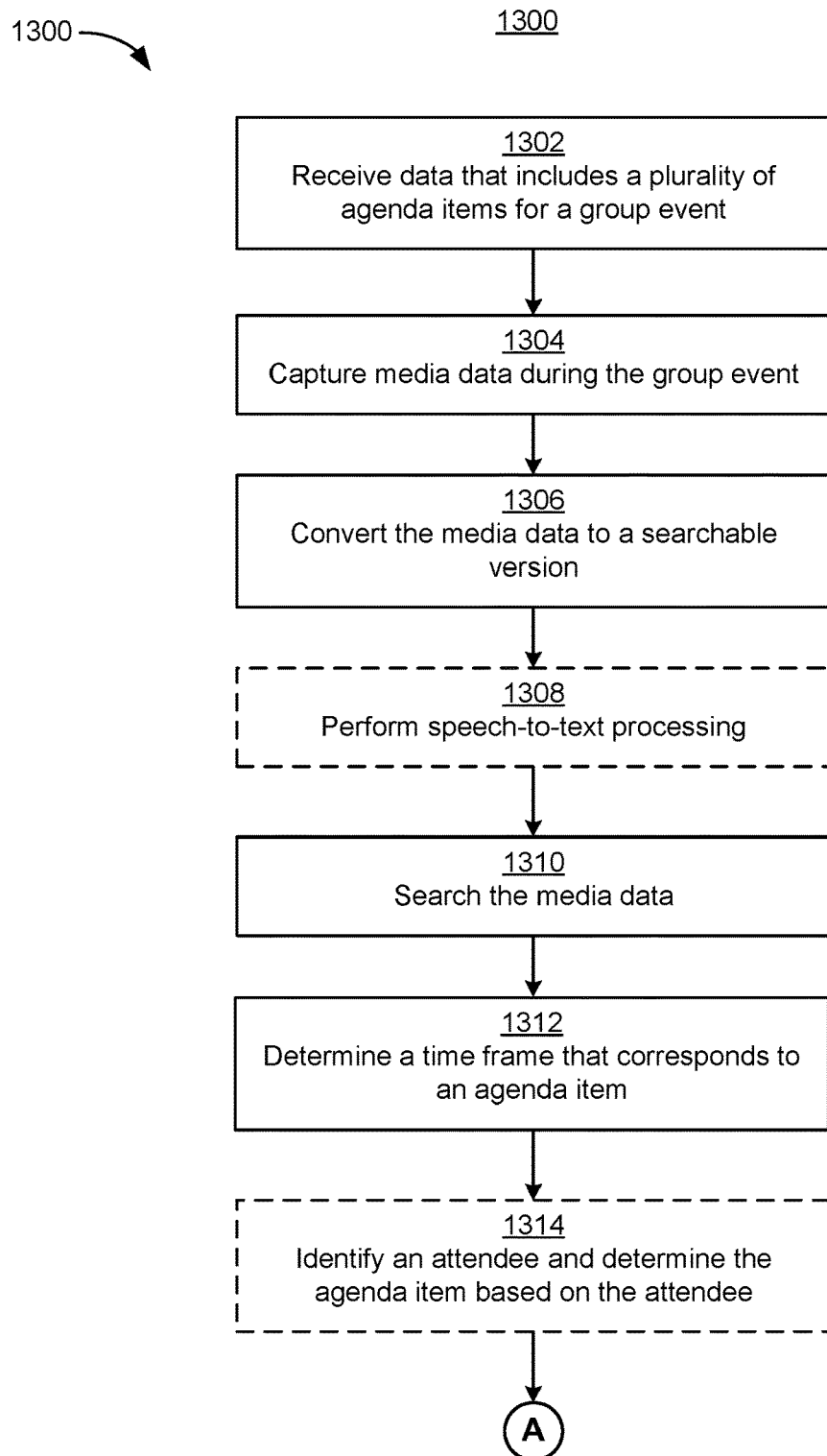
FIGS. 13A-13B are flow diagrams illustrating a method for displaying a representation of media data that corresponds to a group event, in accordance with some embodiments.
Figure 13B:
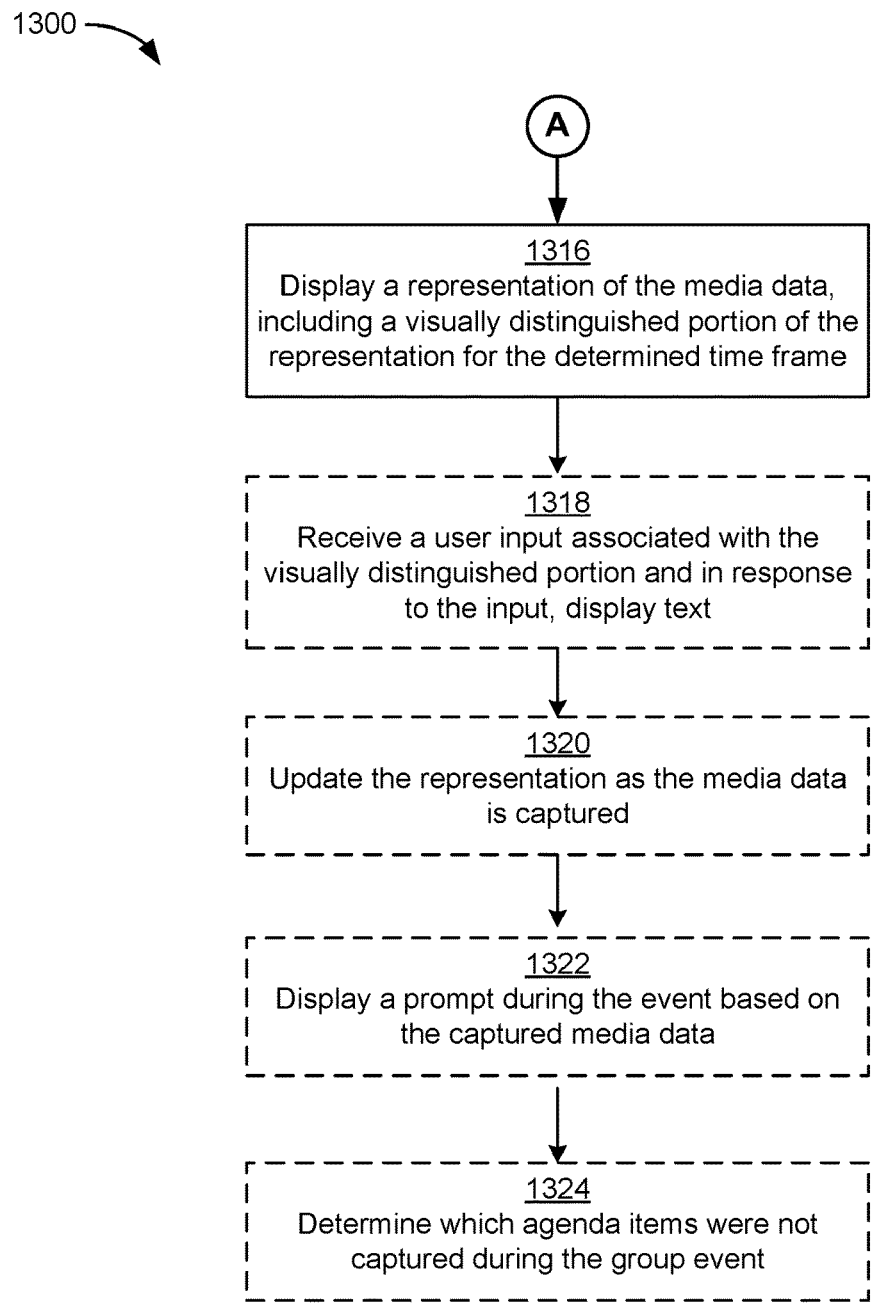

FIGS. 13A-13B are flow diagrams illustrating a method 1300 for displaying a representation of media data that corresponds to a group event, in accordance with some embodiments. The method 1300 is performed at a device, such as server 200. For example, instructions for performing the method 1300 are stored in the memory 202 and executed by the processor(s) 252. In some embodiments, part or all of method 1300 is performed at a user device 300 (e.g., instructions for performing part or all of the method 1300 are stored in memory 304 and executed by processor(s) 352).

The device receives (1302) data that includes indications of a plurality of agenda items (e.g., agenda items stored and/or generated for a meeting) that correspond to the group event. In some embodiments, the indications of the plurality of agenda items are received by server 200 via one or more data transmissions. For example, the plurality of agenda items (e.g., agenda items 1002, FIG. 10A) is stored and retrieved from information compiled by an organization in an organization data structure (e.g., that collects and stores information over a time frame such that the information is usable to automatically generate the plurality of agenda items). In some embodiments, the plurality of agenda items is automatically generated based on information (e.g., tasks) stored by an organization data structure (e.g., as described with regard to FIG. 4). For example, the plurality of agenda items is determined based on information stored in Event_Tasks table 538 and/or from a set of tasks that are associated with a particular project (e.g., indicated by a Project_ID in tasks table 536). In some embodiments, the group event (e.g., meeting) is automatically generated as described above with reference to FIGS. 14-16. In some embodiments, additional agenda items (e.g., tasks 408) are added (e.g., automatically by the device and/or manually by a user) to the agenda shown in meeting note page 630.

In some embodiments, the plurality of agenda items is automatically generated based on an invitation related to the group event. For example, the group event is associated with a group event invitation (e.g., meeting invitation or calendar event). In some embodiments, the plurality of agenda items is automatically generated, without user input, based on text and/or attachments included in the group event invitation. In some embodiments, the plurality of agenda items is generated based on members associated with the group event (e.g., as indicated by data stored in Event_Members 534 and/or Task_Members 540).

In some embodiments, the plurality of agenda items is generated based on information from a plurality of agendas. For example, the organization data structure stores information (e.g., tasks and/or agendas) from multiple sources (e.g., a plurality of distinct groups in the organization and/or a plurality of distinct projects) and automatically combines the information collected into a single group event. Thus, the plurality of agenda items generated for the group event includes agenda items from a plurality of sources. In some embodiments, the device determines, from the media data, a respective agenda of the plurality of agendas that corresponds to (e.g., includes) a current agenda item. For example, the device determines that a current agenda item (e.g., the media data corresponding to the agenda item is currently being captured by the device) is associated with a first agenda (e.g., source) of the plurality of agendas (e.g., sources). In some embodiments, displaying the representation of the media data includes displaying an indication of the determined agenda of the plurality of agendas that corresponds to the current agenda item. Thus, the device determines and displays which agenda (e.g., source) is associated with the current agenda item.

In some embodiments, the received data includes indications of a plurality of group event attendees (e.g., as indicated by data stored in Task_Members 540). For example, the device determines the group event attendees based on the invitees included in the group event invitation and/or by group event attendees identifying themselves during the event. In some embodiments, the device identifies (1314) a first attendee of the plurality of group event attendees and determines, based on the first attendee, the first agenda item of the plurality of media items. For example, the device determines that the first agenda item includes a task associated with (e.g., assigned to) the first attendee or determines that the first agenda item corresponds to a project that is related to the first attendee. In some embodiments, the association between the first attendee and the first agenda item is stored in an organization data structure. In some embodiments, the first attendee is a speaker/presenter of the first agenda item. In some embodiments, the device identifies the first attendee as the person to whom a task and/or decision is assigned.

In some embodiments, the first agenda item is determined and identified (e.g., in the searchable version of the media data) in the media data based on an attendee (e.g., a person associated with the first agenda item) and a portion of the media data (e.g., a phrase) corresponding to the task (e.g., a title of the task or stored text content of the task). For example, the device identifies the attendee (e.g., as a speaker or presenter), and based on the identified attendee's association with the agenda item, the device determines that media data associated with the agenda item is being captured while the identified attendee is presenting. In some embodiments, the device identifies the first attendee by voice processing (e.g., proximity and/or frequency analysis).

During the group event, the device captures (1304), by a media recording device, media data (e.g., audio, video, text input, whiteboard input, and/or content input). During the group event, the device converts (1306) (e.g., via a speech-to-text process) the captured media data to a searchable (e.g. text) version of the media data. In some embodiments, converting the captured media data to the searchable version of the media data includes performing (1308) speech-to-text processing and comparing text obtained from the speech-to-text processing with text that corresponds to the plurality of agenda items.

The devices searches (1310) the searchable version of the media data to determine (1312) a first time frame of the media data that corresponds to a first agenda item of the plurality of agenda items. The device displays (1316), in a user interface (e.g., user interface 310) that is accessible to at least one user associated with the group event, the representation (e.g., representation 652) (e.g., an audio waveform and/or a set of frames of video as described with reference to FIGS. 11A-11E) of the media data. A first portion of the representation of the media data that corresponds to the first time frame is visually distinguished (e.g., highlighted and/or marked with text, an image, or a selectable control) from at least a portion of the representation of the media data that does not correspond to the first time frame.

In some embodiments, the representation 652 comprises a set of frames of video and the first portion of the representation of the media data includes a first frame of the set of frames of video, the first frame having a visually distinguishing feature. (e.g., the frame is highlighted)

In some embodiments, the representation 652 comprises an audio waveform (e.g., as shown in FIGS. 11A-11E) and the first portion of the representation of the media data includes a visually distinguished (e.g., highlighted, zoomed, bolded, etc.) portion of the audio waveform, such as portion 1004-1 in FIG. 11B.

In some embodiments, the device receives an input (e.g., user input 1008) corresponding to the first portion of the representation that corresponds to the first agenda item. The device identifies an additional portion of the representation that corresponds to the first agenda item. In response to the input, the device displays the first portion and the additional portion as visually distinguished from the at least a portion of the representation of the media that that does not correspond to the first agenda item, as shown and described with reference to FIG. 11B.

In some embodiments, the device receives a user input (1318) associated with the first portion of the representation of the media data. In response to the user input, the device displays text (e.g., in text box 1102-1, FIG. 11B) that corresponds to the first agenda item. For example, in response to a hover (e.g., mouseover) of the annotated "first portion" 1004-1, text 1104 and/or text 1106 that corresponds to the agenda item is displayed.

In some embodiments, displaying the first portion of the representation includes displaying text that corresponds to the first agenda item. In some embodiments, the text comprises a link (e.g., a uniform resource locator) to information that corresponds to the first agenda item. For example, the link is associated with a note page associated with a project related to the group event or an event invitation. The link, when activated, causes the device to display the linked note page and/or event invitation to the user. Thus, a user can access (e.g., by selecting the link) more detailed information related to the text displayed in the text boxes 1102.

In some embodiments, information corresponding to a speaker at the group event is displayed at a location in the user interface that corresponds to the first portion of the representation. For example, a speaker (e.g., or presenter) "Sam Jackson" 1106 that corresponds to the first portion 1004-1 of the representation 652, is displayed in the user interface shown in FIG. 11B. In some embodiments, information identifying at least one person associated with the first agenda item is displayed at a location in the user interface that corresponds to the first portion of the representation. For example, the at least one person could be the speaker, presenter, or a person assigned to a task associated with the first portion.

In some embodiments, the representation of the media data is updated (1320) as the media data is captured.

In some embodiments, the device searches the searchable version of the media data to determine a second time frame of the media data that corresponds to a key term associated with the group event, as described with reference to FIG. 11E. In some embodiments, displaying the representation of the media data includes displaying a second portion of the representation of the media data that corresponds to the second time frame. In some embodiments, the device searches the searchable version of the media data to determine time frames that correspond to terms and/or phrases that are significant (e.g., frequently occurring, highlighted, tagged, frequently included in search queries) in content that is stored by an organization data structure for a group. For example, the device determines phrases that are significant to a certain project based on how often members of the project use the phrase and visually distinguishes portions of the timeline of media data that include the significant phrase.

In some embodiments, during the group event, the device displays (1322) a prompt during the event based on the captured media data and the plurality of agenda items, as described with reference to FIG. 12.

In some embodiments, after completion of the group event, the device determines (1324), using the searchable version of the media data, which agenda items (e.g., if any) of the plurality of agenda items were not captured during the group event. For example, the device analyzes the media data, after the meeting, to determine an amount (e.g., percentage) of the agenda items that were discussed compared to the total number of agenda items that were included in the agenda. In some embodiments, the device calculates and assigns a score to the group event and/or attendees that indicates how many of the agenda items were captured (e.g., discussed) during the group event and/or how long (e.g., in minutes) was spent on a given agenda item. This score can be assigned and used over a time period to compare a plurality of group events within the organization (e.g., compare the group events across an industry).

Relationship-Based Search

Storing data related to an organization 402, as described with regard to FIG. 4 and FIGS. 5A-5C, allows information about relationships between members of an organization to be used for improving search results. For example, members of various units within an organization may frequently perform similar searches and therefore stand to benefit from prioritization of search results from similar parts of the organization. In an organization with members at different hierarchal ranks (e.g., engineering head, engineering managers, senior engineers, junior engineers), information that is related to members in a similar hierarchal rank may be more beneficial to a user than information that is related to members in a higher or lower rank. Accordingly, in accordance with embodiments described herein, search results are improved by using a hierarchal rank within an organization to prioritize and/or select a search result.

Figure 14:
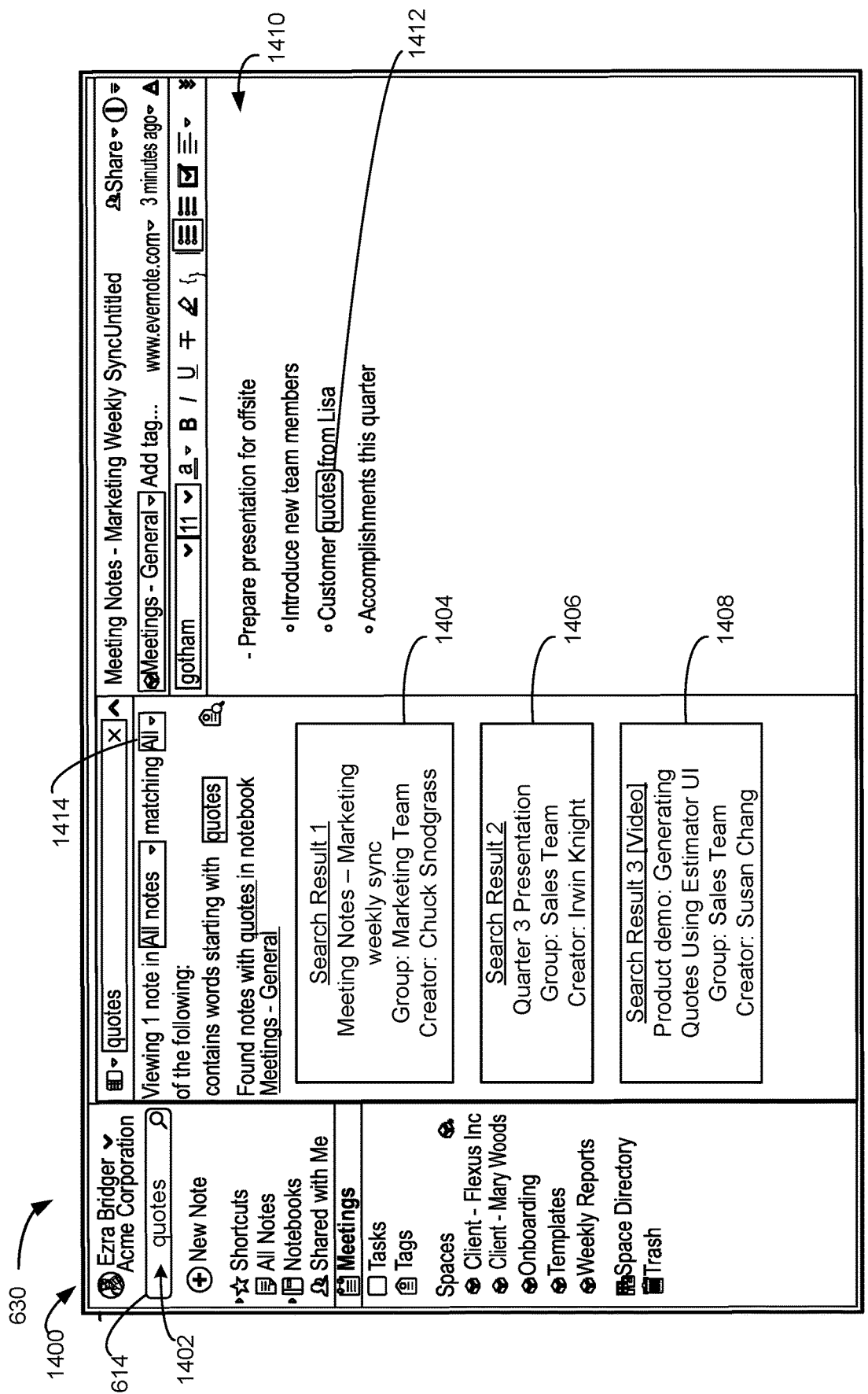
FIG. 14 is an exemplary search user interface for displaying search results, in accordance with some embodiments.

FIG. 14 illustrates an exemplary search user interface 1400 for displaying search results, in accordance with some embodiments. A user has provided search input 1402 (the term "quotes" in search input field 614 of navigation region 612. Search results 1404 ("Meeting Notes—Marketing Team Weekly Sync"), 1406 ("Quarter 3 Presentation"), and 1408 ("Product demo: Generating Quotes Using Estimator UI") are displayed. In some embodiments, content items 1404-1406 correspond to respective content items (e.g., content 406 stored in content items table 508). A detail view 1410 of a content item that corresponds to search result 1404 is displayed in content display region 1408. The search term "quotes" is visually distinguished within the detail view 1410, as indicated at 1412.

Figure 15:
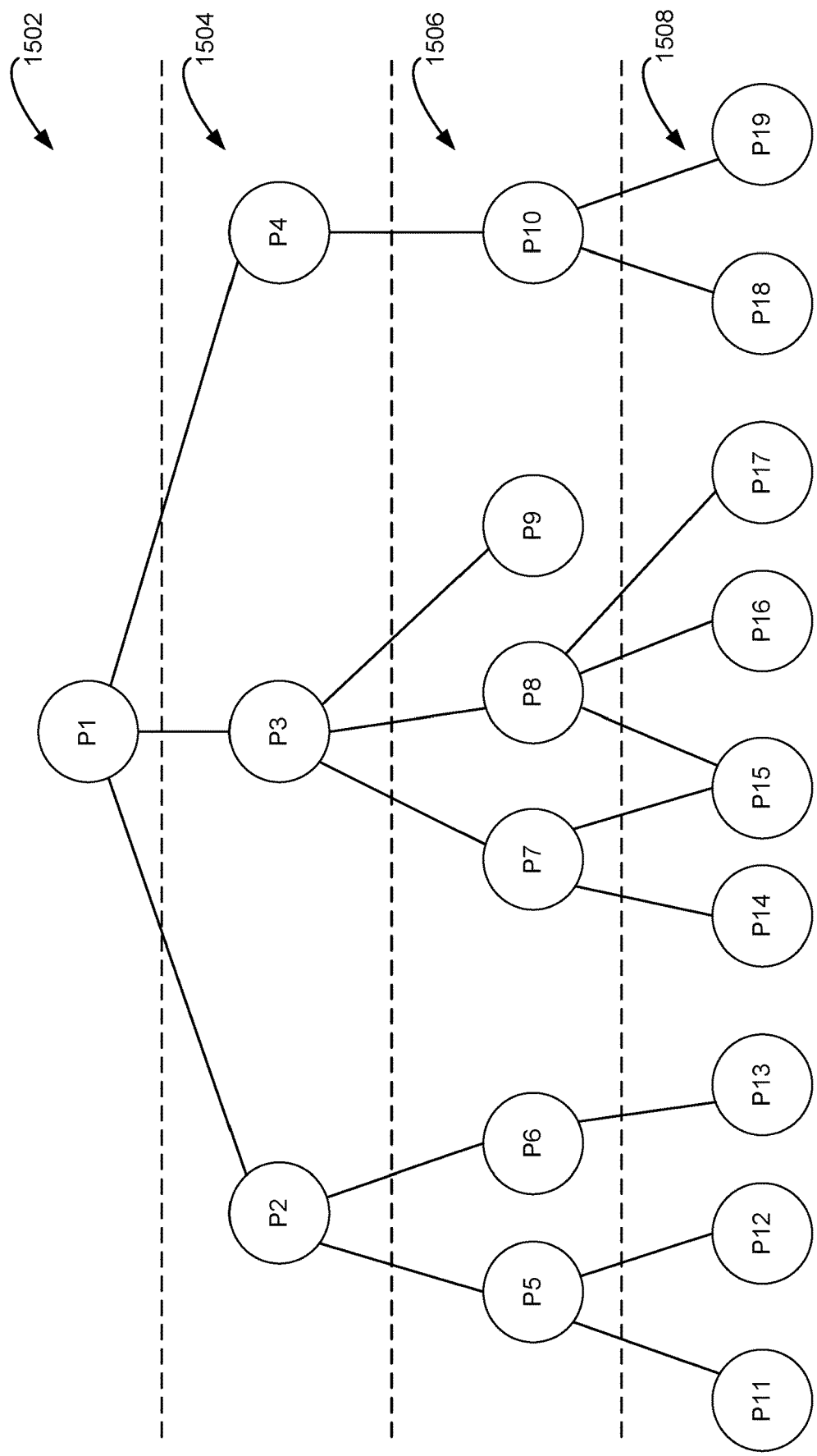
FIG. 15 is a conceptual illustration of hierarchal rank in an organization, in accordance with some embodiments.

FIG. 15 is a conceptual illustration of hierarchal rank in an organization 402, in accordance with some embodiments. Member P1 is a member 412 in a highest rank 1502 (e.g., Rank 1). For example, member P1 is a leader of an organization 402. Members P2, P3, and P4 are in a rank 1504 (e.g., Rank 2) that is between rank 1502 and rank 1504. For example, P2, P3, and P4 are leaders of divisions within organization 402. Members P5, P6, P7, P8, P9, and P10 are in a rank 1506 (e.g., Rank 3) that is between rank 1504 and rank 1508. Members P11, P12, P13, P14, P15, P16, P17, P18, and P19 are in a rank 1508 (e.g., Rank 4) that is below rank 1506. The lines between members indicate direct relationships (e.g., management relationships between members. For example, P11 and P2 are directly managed by P5, who in turn is managed by P2. In some embodiments, hierarchal rank is used as a basis for selecting and/or prioritizing search results delivered in response to a search request. For example, as described further below, if user P5 performs a search for which the determined search results include a first content item associated with P1 (e.g., as described with regard to Member_content table 415), a second content item associated with P2, a third content item associated with P3, and a fourth content item associated with P6, different priorities may be assigned to the first content item, the second content item, the third content item, and the fourth content item based on the rank of P5 relative to P1, P2, P3, and P6 and/or based on whether a direct relationship exists between P5 and P1, P2, P3, and P6.

Figure 16:
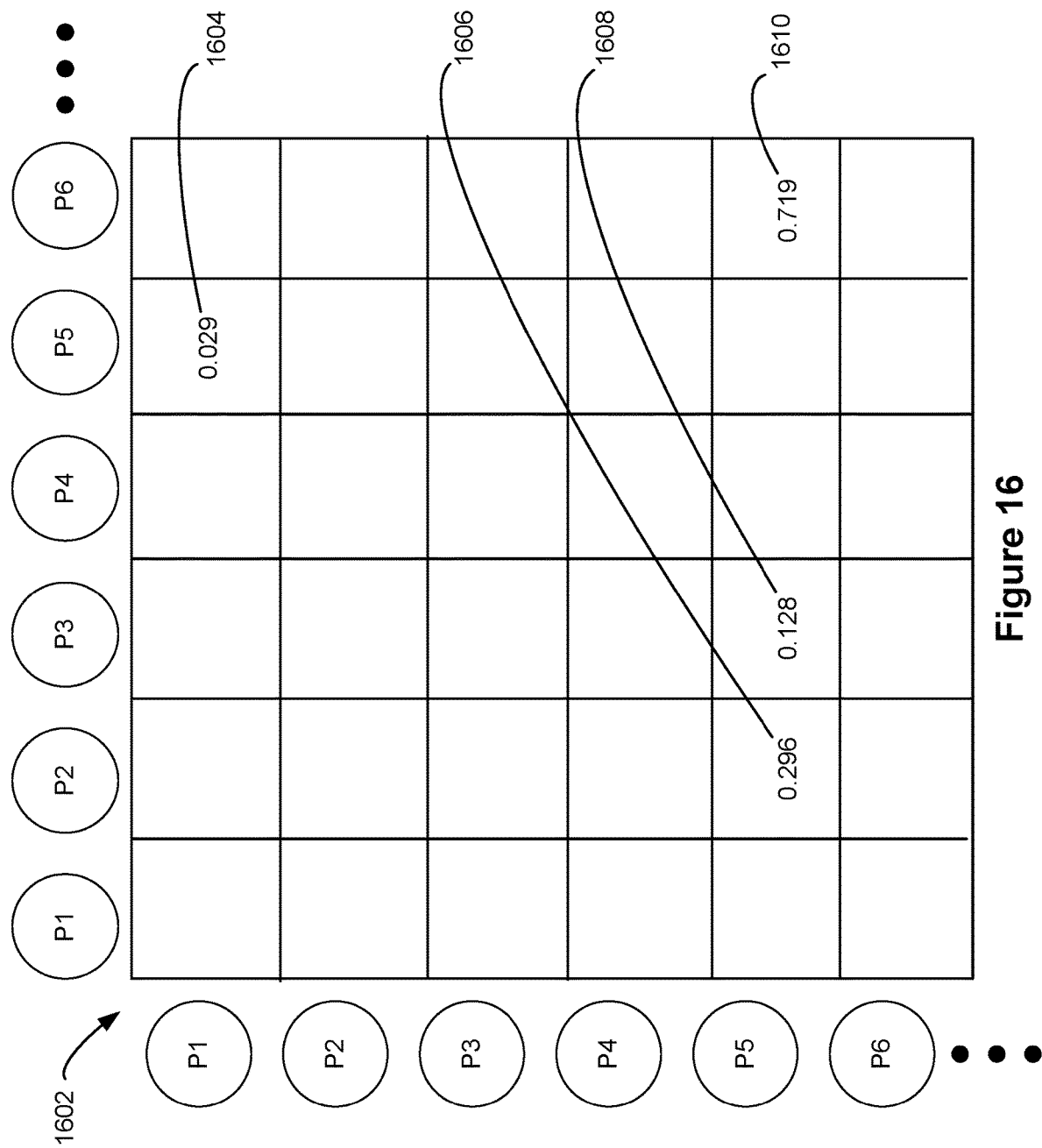
FIG. 16 is a conceptual illustration of stored search result weight data, in accordance with some embodiments.

FIG. 16 is a conceptual illustration of stored relationship-based weight data, in accordance with some embodiments. In some embodiments, a weight assigned to a search result (e.g., a weight determined using a comparison between a hierarchal rank of a group member that corresponds to a search result (e.g., a content item) with the hierarchal rank of the first user) is stored. For example, user P5 performs a search and the search results include a first content item associated with P2, a second content item associated with P3, and a third content item associated with P6. A first weight is determined by comparing the hierarchal rank of P5 (Rank 3) with a hierarchal rank of P2 (Rank 2), a second weight is determined by comparing the hierarchal rank of P5 with a hierarchal rank of P3 (Rank 2), and a third weight is determined by comparing the hierarchal rank of P5 with a hierarchal rank of P6 (Rank 3). Because P5 and P6 have the same hierarchal rank, a weight for the search result associated with P6 has a higher value (e.g., as indicated at 1610) than a weight for the search result associated with P2 (as indicated at 1606). A weight associated with P2 has a higher value for a search performed by P5 than a weight associated with P3 (as indicated at 1608) because P5 has a direct relationship with P2. In some embodiments, the weight assigned to a search result is used to alter an existing relationship value. In some embodiments, the values indicated in FIG. 16 are based on information in addition to a hierarchal rank comparison. A value determined using a hierarchal rank comparison for a search performed by P1 for a search result that corresponds to P5 is indicated at 1604.

Figure 17:
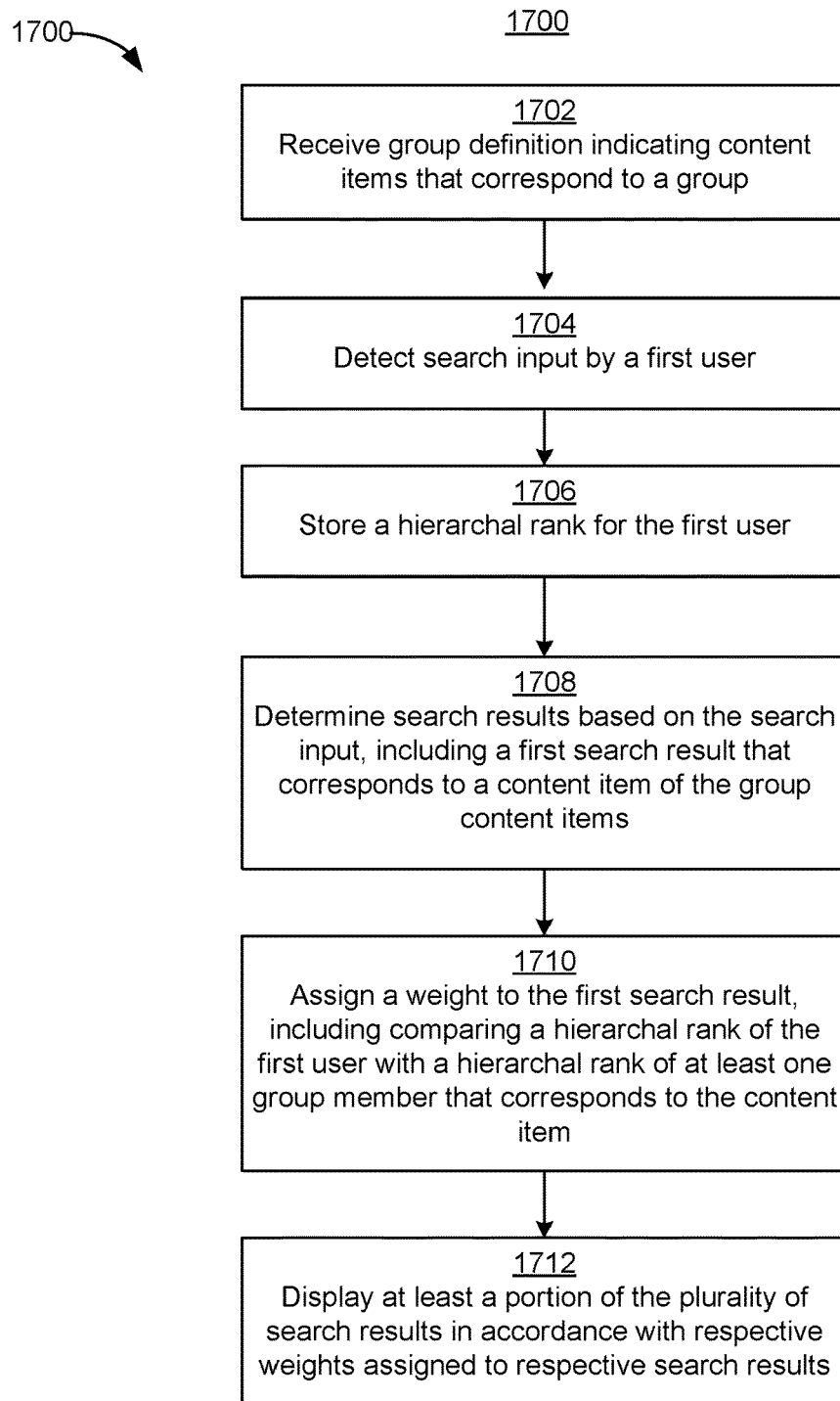
FIG. 17 is a flow diagram illustrating a method for prioritizing search results based on hierarchal ranking, in accordance with some embodiments.

FIG. 17 is a flow diagram illustrating a method 1700 for prioritizing search results based on hierarchal ranking, in accordance with some embodiments. The method 1700 is performed at a device, such as server 200. For example, instructions for performing the method 1700 are stored in the memory 202 and executed by the processor(s) 252. In some embodiments, part or all of method 1700 is performed at a user device 300 (e.g., instructions for performing part or all of the method 1700 are stored in memory 304 and executed by processor(s) 352).

The device receives (1702) a definition of a group (e.g., an organization 402 and/or a division as described with regard to divisions table 504). For example, the definition of the group is received via user input (e.g., user input entered on a client device 300 and transmitted to server 200 for storage by a database as described with regard to FIGS. 5A-5C). The definition of the group includes identifying information for a plurality of group members (e.g., members 412 as described with regard to members table 506 and/or division_members 512). The definition of the group also includes an indication of a hierarchal rank of at least a subset of the plurality of group members. For example, the hierarchal rank is stored in the Hierarchal_Rank column of members table 506. A hierarchal rank corresponds to a position of a respective member of the group relative to other members of the group (e.g., as described with regard to FIG. 15). The definition of the group also includes a plurality of content items that correspond to the group (e.g., content 406 as described with regard to Content_Items table 508) and identifying information indicating at least one group member of the plurality of group members that corresponds to a respective content item of the plurality of content items (e.g., as indicated in Member_Content table 514).

The device detects (1704) a first search input by a first user. For example, the search input is entered in search input field 614 as described with regard to FIG. 14. In some embodiments, the search is performed on a content collection (e.g., all content associated with an organization) or a portion of a content collection. In some embodiments, the search includes a web search (e.g., monitored by a content management platform and/or an enterprise that provides information to the content storage service).

The device stores (1706) an indication of a hierarchal rank for the first user (e.g., in a local cache). For example, group analysis module 230 retrieves a Hierarchal_Rank for the first user from members table 506.

The device determines (1708) a plurality of search results based on the first search input. A first search result of the plurality of search results corresponds to a first content item of the plurality of content items. For example, as described with regard to FIG. 14, search result 1404 corresponds to a content item "Meeting Notes—Marketing weekly sync." A first weight is assigned (1710) to the first search result, wherein determining the first weight includes comparing a hierarchal rank of at least one group member that corresponds to the first content item with the hierarchal rank of the first user. For example, the at least one group member created the content item, accessed the content item, edited the content item, and/or previously searched for the content item. In some embodiments, content associated with a group member that has the same hierarchal rank as the first user has higher weight than group member that has a different hierarchal rank. In some embodiments, the first weight is decreased as the difference between the hierarchal rank of the group member and the hierarchal rank of the first user increases. In some embodiments, content associated with users that are related (e.g., a direct hierarchal connection, such as content of a direct manager of the first user) has a higher weight than users that are not related. For example, as described with regard to FIG. 16, a weight associated with P2 has a higher value for a search performed by P5 than a weight associated with P3 (as indicated at 1608) because P5 has a direct relationship with P2. In some embodiments, determining a first weight includes determining additional factors such as time of day of the search (e.g., to prioritize search results relevant for the time of day), connection of the content item to a project that is associated with the first user (e.g., as described with regard to Project_Content table 516, for a user that is connected to a task via tasks table 536 and Task_Members table 540), a project associated with a member, and/or search similarity between group member and first user.

The device displays (1712) at least a portion of the plurality of search results (e.g., in search user interface 1400) in accordance with respective weights assigned to respective search results.

In some embodiments, the first weight has an initial value (e.g., a search similarity between the first user and the group member, which may be stored as described with regard to FIG. 16), and, prior to assigning the first weight to the first search result, the device adjusts the initial value in accordance with a determination that the hierarchal rank of the at least one group member is the same as the hierarchal rank of the first user.

In some embodiments, prior to assigning the first weight to the first search result, the device adjusts the initial value in accordance with a determination that the at least one group member has a direct relationship with the first user.

In some embodiments, prior to assigning the first weight to the first search result, the device adjusts the first weight in accordance with a determination that the hierarchal rank of the at least one group member differs from the hierarchal rank of the first by more than a threshold amount.

In some embodiments, the device stores the adjusted initial value (e.g., by updating a value of the table described with regard to FIG. 16).

In some embodiments, the device displays identifying information for the at least one group member that corresponds to the first content item. For example, as shown in FIG. 16, member identifying information (e.g., "Creator: Chuck Snodgrass") is displayed for search result 1404 as well as for search results 1406 and 1408.

In some embodiments, the device displays identifying information for a respective group that corresponds to the first content item. For example, as shown in FIG. 16, group identifying information (e.g., "Group: Marketing Team") is displayed for search result 1404 as well as for search results 1406 and 1408.

In some embodiments, the device stores the determined first weight, and in accordance with a determination that a hierarchal rank of a respective group member has changed, the device adjusts the determined first weight. In some embodiments, the device adjusts the determined first weight in accordance with a determination that a hierarchal rank of the first user has changed.

In some embodiments, in accordance with a determination that the first weight meets first group criteria (e.g., criteria met in accordance with a determination that the first weight exceeds a predetermined threshold), the device displays a prompt that includes a suggestion to prioritize content items associated with at least one group that corresponds to the at least one group member.

In some embodiments, in accordance with a determination that the first weight meets second group criteria (e.g., criteria met in accordance with a determination that the first weight exceeds a predetermined threshold), the device displays a prompt that includes a suggestion to add the first user to at least one group that corresponds to the at least one group member.

In some embodiments, in accordance with a determination that the first weight meets third group criteria (e.g., criteria met in accordance with a determination that the first weight exceeds a predetermined threshold), the device displays a control for filtering search results by at least one group that corresponds to the at least one group member. For example, a set of filters. For example, filter 1414, shown set to "All" in FIG. 14, includes an option for selecting an identifier of a division that corresponds to the at least one group member. In some embodiments, the filter includes an option for selecting an identifier of a project that corresponds to the at least one group member.

In some embodiments, the definition of the group includes an indication of a role (e.g., a position and/or title) of at least a subset of the plurality of group members, an indication of a role is stored for the first user, and determining the first weight includes comparing a role of at least one group member that corresponds to the first content item with the role of the first user. A role is, for example, a Member_Role stored in members table 506 (FIG. 5A). For example, the title "director" may belong to members with different hierarchal rank and, within a hierarchal rank, there may be members with the title "director" and members with different titles. A user performing a search may wish for content associated with members that have the same title as the user to be prioritized in search results. In some embodiments, to perform role-based prioritization of a content item in a set of search results, a first weight may be increased (e.g., by a predetermined value or ratio) in accordance with a determination that a role of a user matches a role of a group member who is associated with the content item.

In some embodiments, the definition of the group includes an indication of a subgroup association of at least a subset of the plurality of group members, an indication of a subgroup that includes the first user is stored for the first user, and determining the first weight includes determining whether the subgroup that includes the first user corresponds to a subgroup association of at least one group member that corresponds to the first content item. For example, a subgroup may be a division (e.g., as described with regard to divisions table 504) of an organization (e.g., as described with regard to organizations table 502). A user performing a search may wish for content associated with members who are in the same subgroup as the user (e.g., as indicated by Division_Members table 512) to be prioritized in search results. For example, if the user is a member of the engineering division, the user may wish for content items associated with other members of the engineering division to be prioritized. In some embodiments, to perform subgroup-based prioritization of a content item in a set of search results, a first weight may be increased (e.g., by a predetermined value or ratio) in accordance with a determination that a subgroup of the user matches a subgroup of a group member who is associated with the content item.

In some embodiments, the device analyzes the plurality of content items to determine a set of characteristic terms (e.g., words, phrases, and/or tags) that correspond to respective members of the group. Characteristic terms are terms that are frequently searched for by members of a group or subgroup and/or frequently included in content items associated with members of a group or subgroup. In some embodiments, characteristic terms are stored in Search_Terms table 560. A user performing a search may wish for content associated with terms that are characteristically used by particular members (e.g., terms associated with members of an organization (as indicated by Organization_Search_Terms 562), terms associated with members of a division (as indicated by Division_Search_Terms 564) and/or terms associated with individual members (as indicated by Member_Search_Terms 566)) to be prioritized in search results. For example, if members of an engineering division typically use the acronym "POA" to mean portable object adapter and members of a legal division typically use the acronym "POA" to mean power of attorney, a user performing a search using a search query that includes the term "POA" may wish for content items from the engineering division and including the term POA to be prioritized over content items from other divisions that include the term POA. In some embodiments, to perform characteristic-term-based prioritization of a content item in a set of search results that correspond to a search term, a first weight for a content item may be increased (e.g., by a predetermined value or ratio) in accordance with a determination that the search term corresponds to a characteristic search term associated with the user, a division of the user, and/or a group of the user and the content item includes the characteristic search term.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., memory 202, 302) can include, but is not limited to, high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 202, 302 optionally includes one or more storage devices remotely located from the CPU(s) 252, 352. Memory 202, 302 or alternatively the non-volatile memory device(s) within memory 202, 302 comprises a non-transitory computer readable storage medium.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems, and execution environments/containers.

Communication systems as referred to herein (e.g., communication system 256, 256) optionally communicate via wired and/or wireless communication connections. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 102.11a, IEEE 102.11ac, IEEE 102.11ax, IEEE 102.11b, IEEE 102.11g and/or IEEE 102.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method for displaying a representation of media data that corresponds to a group event, the method comprising, at a computing device:
   obtaining data that includes indications of a plurality of agenda items from an agenda that correspond to the group event; and
   during the group event:
      obtaining media data captured by a media recording device;
      converting the captured media data to a searchable version of the media data;
      determining non-consecutive time frames of the media data during which at least one of a first agenda item and a second distinct agenda item of the plurality of agenda items is discussed; and
      enabling display of the representation of the media data in a user interface that is accessible to at least one user associated with the group event, wherein the representation comprises an audio waveform, including:
         arranging a plurality of portions of the representation along a time axis, each portion representing a respective subset of the media data captured for a respective one of the plurality of agenda items during a respective time frame;
         determining that a plurality of first non-contiguous portions of the representation of the media data discuss the first agenda item and that a second portion of the representation of the media data discusses the second agenda item, each of the first non-contiguous portions and second portion of the representation of the media data captured during a respective time frame of the non-consecutive time frames, wherein on the time axis, the second portion of the second agenda item separates two of the first non-contiguous portions of the first agenda item, wherein the plurality of portions, the plurality of first non-contiguous portions, and the second portion of the representation include respective portions of the audio waveform, wherein the non-consecutive time frames include a first time frame and a second time frame that is distinct from and non-consecutive to the first time frame of the two of the first non-contiguous portions;
         determining a third time frame of the media data during which a second agenda item of the plurality of agenda items is discussed, the second agenda item being distinct from the first agenda item;
         determining that the second portion of the representation of the media data, distinct from the plurality of first non-contiguous portions of the media data, discusses the second agenda item during the third time frame, wherein arranging the plurality of portions of the representation along the time axis including arranging the third time frame of the second portion of the representation between the first time frame and the second time frame and separating the two of the first non-contiguous portions;
         detecting a user input action at any one of the first non-contiguous portions of the representation discussing the first agenda item; and
         in response to detecting a user input action at any one of the first non-contiguous portions of the representation discussing the first agenda item:
            visually emphasizing all of the plurality of the first non-contiguous portions of the representation of the media data captured during respective time frames of the non-consecutive time frames discussing the first agenda item including the first time frame and the second time frame;
            displaying text describing the first agenda item with the plurality of the first non-contiguous portions of the representation of the media data; and
            displaying the second portion of the representation of the media data that separates the two of the first non-contiguous portions without the visual emphasis of all of the plurality of the first non-contiguous portions of the representation of the media data.

2. The method of claim 1, wherein the plurality of agenda items is automatically generated based on information stored by an organization data structure.

3. The method of claim 1, wherein the plurality of agenda items is generated based on information from a plurality of agendas, the method further comprising:
   determining, from the media data, a respective agenda of the plurality of agendas that includes to the first agenda item,
   wherein displaying the representation of the media data includes displaying an indication of a source of the respective agenda of the plurality of agendas that includes the first agenda item, wherein the source is one or more of: a project within an organization, a calendar invitation, or a group event invitation.

4. The method of claim 1, wherein the obtained data includes indications of a plurality of group event attendees, the method further comprising:
   identifying a first attendee of the plurality of group event attendees, wherein the first agenda item is assigned to the first attendee and a task is assigned to the first attendee; and
   determining that the first agenda item of the plurality of agenda items is associated to the task based on the first agenda item and the task being assigned to the first attendee.

5. The method of claim 1, wherein converting the captured media data to the searchable version of the media data includes performing speech-to-text processing and comparing text obtained from the speech-to-text processing with text that corresponds to the plurality of agenda items.

6. The method of claim 1, wherein the representation comprises a set of frames of video, and one of the plurality of first non-contiguous portions of the representation of the media data includes a first frame of the set of frames of video, the first frame being visually emphasized relative to other frames of the video.

7. The method of claim 1, wherein the media data includes data recorded at a plurality of personal devices of respective attendees of the group event.

8. The method of claim 1, wherein enabling display of the representation of the media data in a user interface further includes:
providing the representation of the media data and the plurality of agenda items for simultaneous display, including displaying one or more markers to visually distinguish portions of the representation that correspond to the displayed agenda items.

9. The method of claim 1, wherein received data includes indications of a plurality of group event attendees, the method further comprising:
identifying a first attendee, of the plurality of group event attendees, that is associated with a project, wherein the first agenda item is assigned to the first attendee; and
determining that the first agenda item of the plurality of agenda items is associated to the project based on: (i) an association of the first attendee with the project and (ii) the first agenda item being assigned to the first attendee.

10. An electronic device, comprising:
one or more processors; and
memory storing one or more programs for execution by the one or more processors, the one or more programs including instructions for:
obtaining data that includes indications of a plurality of agenda items from an agenda that correspond to a group event; and
during the group event:
obtaining media data captured by a media recording device;
converting the captured media data to a searchable version of the media data;
determining non-consecutive time frames of the media data during which at least one of a first agenda item and a second distinct agenda item of the plurality of agenda items is discussed; and
enabling display of a representation of the media data in a user interface that is accessible to at least one user associated with the group event, wherein the representation comprises an audio waveform, including:
arranging a plurality of portions of the representation along a time axis, each portion representing a respective subset of the media data captured for a respective one of the plurality of agenda items during a respective time frame;
determining that a plurality of first non-contiguous portions of the representation of the media data discuss the first agenda item and that a second portion of the representation of the media data discusses the second agenda item, each of the first non-contiguous portions and second portion of the representation of the media data captured during a respective time frame of the non-consecutive time frames, wherein on the time axis, the second portion of the second agenda item separates two of the first non-contiguous portions of the first agenda item, wherein the plurality of portions, the plurality of first non-contiguous portions, and the second portion of the representation include respective portions of the audio waveform, wherein the non-consecutive time frames include a first time frame and a second time frame that is distinct from and non-consecutive to the first time frame of the two of the first non-contiguous portions;
determining a third time frame of the media data during which a second agenda item of the plurality of agenda items is discussed, the second agenda item being distinct from the first agenda item;
determining that the second portion of the representation of the media data, distinct from the plurality of first non-contiguous portions of the media data, discusses the second agenda item during the third time frame, wherein arranging the plurality of portions of the representation along the time axis including arranging the third time frame of the second portion of the representation between the first time frame and the second time frame and separating the two of the first non-contiguous portions;
detecting a user input action at any one of the first non-contiguous portions of the representation discussing the first agenda item; and
in response to detecting a user input action at any one of the first non-contiguous portions of the representation discussing the first agenda item:
visually emphasizing all of the plurality of the first non-contiguous portions of the representation of the media data captured during respective time frames of the non-consecutive time frames discussing the first agenda item including the first time frame and the second time frame;
displaying text describing the first agenda item with the plurality of the first non-contiguous portions of the representation of the media data; and
displaying the second portion of the representation of the media data that separates the two of the first non-contiguous portions without the visual emphasis of all of the plurality of the first non-contiguous portions of the representation of the media data.

11. The electronic device of claim 10, wherein information corresponding to a speaker at the group event is displayed at a location in the user interface that corresponds to a portion of the representation associated with the speaker.

12. The electronic device of claim 10, wherein information identifying at least one person associated with the first agenda item is displayed at a location in the user interface that corresponds to the first non-contiguous portions of the representation.

13. The electronic device of claim 10, wherein the representation of the media data is updated as the media data is captured.

14. The electronic device of claim 10, wherein the obtained data includes indications of a plurality of group event attendees, the one or more programs further comprising instructions for:
identifying a first attendee of the plurality of group event attendees, wherein the first agenda item is assigned to the first attendee and a task is assigned to the first attendee; and determining that the first agenda item of the plurality of agenda items is associated to the task based on the first agenda item and the task being assigned to the first attendee.

15. The electronic device of claim 10, wherein converting the captured media data to the searchable version of the media data includes performing speech-to-text processing and comparing text obtained from the speech-to-text processing with text that corresponds to the plurality of agenda items.

16. A non-transitory computer-readable storage medium storing one or more programs for execution by one or more processors of an electronic device, the one or more programs comprising instructions for:
  obtaining data that includes indications of a plurality of agenda items from an agenda that correspond to a group event; and
  during the group event:
    obtaining media data captured by a media recording device;
    converting the captured media data to a searchable version of the media data;
    determining non-consecutive time frames of the media data during which at least one of a first agenda item and a second distinct agenda item of the plurality of agenda items is discussed; and
    enabling display of a representation of the media data in a user interface that is accessible to at least one user associated with the group event, wherein the representation comprises an audio waveform, including:
      arranging a plurality of portions of the representation along a time axis, each portion representing a respective subset of the media data captured for a respective one of the plurality of agenda items during a respective time frame;
      determining that a plurality of first non-contiguous portions of the representation of the media data discuss the first agenda item and that a second portion of the representation of the media data discusses the second agenda item, each of the first non-contiguous portions and second portion of the representation of the media data captured during a respective time frame of the non-consecutive time frames, wherein on the time axis, the second portion of the second agenda item separates two of the first non-contiguous portions of the first agenda item, wherein the plurality of portions, the plurality of first non-contiguous portions, and the second portion of the representation include respective portions of the audio waveform, wherein the non-consecutive time frames include a first time frame and a second time frame that is distinct from and non-consecutive to the first time frame of the two of the first non-contiguous portions;
      determining a third time frame of the media data during which a second agenda item of the plurality of agenda items is discussed, the second agenda item being distinct from the first agenda item;
      determining that the second portion of the representation of the media data, distinct from the plurality of first non-contiguous portions of the media data, discusses the second agenda item during the third time frame, wherein arranging the plurality of portions of the representation along the time axis including arranging the third time frame of the second portion of the representation between the first time frame and the second time frame and separating the two of the first non-contiguous portions;
      detecting a user input action at any one of the first non-contiguous portions of the representation discussing the first agenda item; and
      in response to detecting a user input action at any one of the first non-contiguous portions of the representation discussing the first agenda item:
        visually emphasizing all of the plurality of the first non-contiguous portions of the representation of the media data captured during respective time frames of the non-consecutive time frames discussing the first agenda item including the first time frame and the second time frame;
        displaying text describing the first agenda item with the plurality of the first non-contiguous portions of the representation of the media data; and
        displaying the second portion of the representation of the media data that separates the two of the first non-contiguous portions without the visual emphasis of all of the plurality of the first non-contiguous portions of the representation of the media data.

17. The non-transitory computer-readable storage medium of claim 16, the one or more programs further comprising instructions for, searching the searchable version of the media data to determine a second time frame of the media data that corresponds to a key term associated with the group event, wherein displaying the representation of the media data includes displaying a portion of the representation of the media data that corresponds to the second time frame.

18. The non-transitory computer-readable storage medium of claim 16, the one or more programs further comprising instructions for, during the group event, displaying a prompt during the group event based on the captured media data and the plurality of agenda items, wherein the prompt includes any of:
  an indication of a remaining time for the group event; and
  information indicating agenda items of the plurality of agenda items that have not yet been captured.

19. The non-transitory computer-readable storage medium of claim 16, the one or more programs further comprising instructions for, during the group event, displaying a prompt during the group event based on the captured media data and the plurality of agenda items, wherein the prompt is displayed in response to any of and conveys information related to:
  a length of time of the group event satisfying a threshold; and
  a determination of a threshold time remaining with respect to a scheduled amount of time for the group event.

20. The non-transitory computer-readable storage medium of claim 16, wherein the plurality of agenda items is automatically generated based on information stored by an organization data structure.

21. The non-transitory computer-readable storage medium of claim 16, wherein the plurality of agenda items is generated based on information from a plurality of agendas, the one or more programs further comprising instructions for:

determining, from the media data, a respective agenda of the plurality of agendas that includes to the first agenda item,
wherein displaying the representation of the media data includes displaying an indication of a source of the respective agenda of the plurality of agendas that includes the first agenda item, wherein the source is one or more of: a project within an organization, a calendar invitation, or a group event invitation.

* * * * *